(12) United States Patent
Tucker et al.

(10) Patent No.: US 11,513,942 B2
(45) Date of Patent: Nov. 29, 2022

(54) DEBUG SESSION MANAGEMENT

(71) Applicant: ServiceNow, Inc., Santa Clara, CA (US)

(72) Inventors: Christopher Tucker, San Diego, CA (US); Qian Zhang, San Diego, CA (US); Carl David Solis, Jr., San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 360 days.

(21) Appl. No.: 16/786,591

(22) Filed: Feb. 10, 2020

(65) Prior Publication Data

US 2020/0250073 A1 Aug. 6, 2020

Related U.S. Application Data

(63) Continuation of application No. 16/057,173, filed on Aug. 7, 2018, now Pat. No. 10,579,504, which is a continuation of application No. 15/341,358, filed on Nov. 2, 2016, now Pat. No. 10,049,028.

(51) Int. Cl.
*G06F 11/00* (2006.01)
*G06F 11/36* (2006.01)

(52) U.S. Cl.
CPC ...... *G06F 11/3636* (2013.01); *G06F 11/3624* (2013.01); *G06F 11/3664* (2013.01)

(58) Field of Classification Search
CPC ............. G06F 11/3624; G06F 11/3636; G06F 11/3664
See application file for complete search history.

(56) References Cited

U.S. PATENT DOCUMENTS

| 6,678,887 | B1 | 1/2004 | Hallman |
| 6,704,117 | B1 | 3/2004 | Chintakrindi et al. |
| 6,708,195 | B1 | 3/2004 | Borman et al. |
| 7,020,706 | B2 | 3/2006 | Cates |
| 7,451,403 | B1 * | 11/2008 | Srinivasan ............... G06F 8/10 715/765 |

(Continued)

OTHER PUBLICATIONS

OSDir.com "Subject: Getiing Rhino Debugger Working in Servlets", Mozilla.devel.jseng- msg#00077, Recent Discussion OSDir.oom, Date Unknown, downloaded Oct. 18, 2016, http://osdir.com/ml/mozilla.devel. Dseng/2005-09/msg00077 .html, 7 pp.

(Continued)

*Primary Examiner* — Joshua P Lottich
(74) *Attorney, Agent, or Firm* — Fletcher Yoder PC

(57) ABSTRACT

Systems and methods are disclosed for debug session management. For example, methods may include receiving a request from a client device and, in response, identifying a set of instructions to be executed, wherein the set of instructions is associated with at least one breakpoint. The methods may include initiating execution of the set of instructions. The methods may include determining, based on a marker, that pausing execution of the set of instructions using a data structure is permitted, and responsive to this determination: pausing execution of the set of instructions before executing an instruction associated with a breakpoint, and updating the marker to indicate that execution of the set of instructions has paused using the data structure.

20 Claims, 12 Drawing Sheets

(56) References Cited

U.S. PATENT DOCUMENTS

| | | | |
|---|---|---|---|
| 7,716,353 | B2 | 5/2010 | Golovinsky |
| 7,769,718 | B2 | 8/2010 | Murley |
| 7,925,981 | B2 | 4/2011 | Pourheidari |
| 8,107,451 | B2 | 1/2012 | Agbaria et al. |
| 8,214,442 | B2 | 7/2012 | Finkelstein et al. |
| 8,402,127 | B2 | 3/2013 | Solin |
| 8,495,589 | B2 | 7/2013 | Bates |
| 8,612,408 | B2 | 12/2013 | Trinon |
| 8,832,652 | B2 | 9/2014 | Mueller |
| 9,065,783 | B2 | 6/2015 | Ding |
| 9,098,322 | B2 | 8/2015 | Apte |
| 9,104,800 | B2 | 8/2015 | Bragstad et al. |
| 9,122,552 | B2 | 9/2015 | Whitney |
| 9,317,327 | B2 | 4/2016 | Apte |
| 9,363,252 | B2 | 6/2016 | Mueller |
| 9,535,737 | B2 | 1/2017 | Joy |
| 9,557,969 | B2 | 1/2017 | Sharma |
| 9,645,833 | B2 | 5/2017 | Mueller |
| 9,654,473 | B2 | 5/2017 | Miller |
| 9,766,935 | B2 | 9/2017 | Kelkar |
| 9,805,322 | B2 | 10/2017 | Kelkar |
| 2003/0217354 | A1* | 11/2003 | Bates ............... G06F 11/362 717/129 |
| 2004/0205747 | A1 | 10/2004 | Bernstein et al. |
| 2004/0225920 | A1* | 11/2004 | Bates ............... G06F 11/362 714/E11.207 |
| 2004/0226003 | A1* | 11/2004 | Bates ............... G06F 11/3664 717/129 |
| 2004/0255278 | A1* | 12/2004 | Bates ............... G06F 11/3664 717/129 |
| 2005/0066314 | A1* | 3/2005 | Bates ............... G06F 11/3644 717/129 |
| 2007/0168736 | A1* | 7/2007 | Ottavi ............... G06F 11/3644 714/34 |
| 2007/0226740 | A1 | 9/2007 | Li et al. |
| 2012/0117041 | A1* | 5/2012 | Rodriguez .......... G06F 11/3664 707/E17.032 |
| 2012/0278790 | A1* | 11/2012 | Bates ............... H04L 67/10 717/130 |
| 2012/0317443 | A1 | 12/2012 | Chandran et al. |
| 2013/0067438 | A1 | 3/2013 | Bates |
| 2014/0196013 | A1* | 7/2014 | Orr ............... G06F 11/3664 717/125 |
| 2014/0258985 | A1* | 9/2014 | Yawn ............... G06F 11/3624 717/125 |
| 2016/0321159 | A1* | 11/2016 | Romm ............... G06F 3/04842 |
| 2016/0328308 | A1 | 11/2016 | Pywell |
| 2017/0206153 | A1* | 7/2017 | Lan ............... G06F 11/362 |

OTHER PUBLICATIONS

Stack Overflow, "Remote Debugging Threads With Different Debuggers", Java—Stack Overflow, edited Jul. 10, 2013, downloaded Oct. 18, 2016, http:l/stackoverflow.com/questions/17541100/remote-debugging-threads-with-different-debuggers, 2 pp.

Eclipsepedia, "JSDT/Debug/Rhino/Embedding Rhino Debugger", Overview I Setting Up The Rhino Debugger, Date Unknown, downloaded Oct. 18, 2016, http://wiki.eclipse.org/JSDT/Debug/Rhino/Embedding_Rhino_Debugger, 3 pp.

Netbeans, "Debugging Java Applications", NetBeans IDE Field Guide, Date Unknown, downloaded Oct. 18, 2016, https://netbeans.org/project_d ownloads/usersguide/nbfieldguide/Chapter5-Debugging pdf, 22 pp.

Nelson, Patrick, "Javascript/Native Interop Debugging in Visual Studio 2013", Microsoft Application Lifecycle Management, Jun. 28, 2013, downloaded Oct. 18, 2016, https://blogs.msdn.microsoft.com/visualstudioalm/2013/06/28/javascriptnative-interop-debugging-in-visual-studio-2013/, 13 pp.

Jetty, "Debugging With Eclipse", Chapter 34 Debugging, Version: 9.4.0-Snapshot, Date Unknown, downloaded Oct. 18, 2016, http://www.eclipse.org/jetty/documentation/9.4.x/debugging-with-eclipse.html,3 pp.

Google Groups, "Rhino Debugger Against Embedded Engine", May 1, 2009, downloaded Oct. 18, 2016, https://groups.google.com/forum/#ltopic/mozilla.dev.tech js-engine rhino/pNJIUd_2ueg, 1 page.

Llegal Argument Exception, "Javascript: Debugging With Embedded Rhino", Miscellaneous Computer Code, Feb. 10, 2013, downloaded Oct. 18, 2016, http://illegalargumentexception.blogspot.co.uk/2013/02/javascript-debugging-with-embedded-rhino.html, 4 pp.

Itec, "Thread Debugging", Date Unknown, downloaded Nov. 2, 2016, http://www.itec.uni-klu.ac.at/-harald/CSE/Content/debugging.html, 4 pp.

Oracle, "JDB—The Java Debugger", jdb helps you find and fix bugs in Java language programs, Date Unknown, downloaded Nov. 2, 2016, http://docs.oracle.com/javase/7/docs/technotes/tools/windows/jdb.html, 3 pp.

* cited by examiner

DEBUG SESSION MANAGEMENT

CROSS REFERENCE TO RELATED APPLICATIONS

This application is a continuation of U.S. patent application Ser. No. 16/057,173, filed Aug. 7, 2018; which claims priority to U.S. patent application Ser. No. 15/341,358, filed Nov. 2, 2016, both of which are hereby incorporated by reference in their entirety.

TECHNICAL FIELD

This disclosure relates in general to debug session management.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Software code, such as scripts may include errors, which can also be referred to as bugs. Persons responsible for writing or maintaining code need to find bugs in their code and fix them. Running code up to a stopping point and examining the values of variables used by the code can help to find bugs in the code so that those bugs may be fixed. Debuggers are tools used by developers of code to help them find bugs in their code. Debuggers, can for example, run code being debugged until an instruction associated with a breakpoint is reached and then pause execution. Which instructions in the code are associated with breakpoints may be selected by a user. The input passed to an instance of code being debugged may affect which instructions in the code are actually executed.

A server can provide a server-based web application (e.g., using platform software to provide configurable and extensible functionality for developing web-based applications). A client and a server can communicate over protocols such as HTTP. Client-server interactions can be carried out over a series of related client requests and server responses. A computing network environment may impose restrictions on the types of messages that can sent from a server to a client. For example, some computer networks use firewalls that may prevent a server from sending unsolicited messages to a client.

An application can maintain state between requests by using a data structure (e.g., a session data structure) to store state information used by the application. For example, a session can start with the first request that the client makes to the server and can end when the client disconnects or the session times out and a corresponding session data structure may be maintained during that period of time. The state information stored in a data structure can be application-specific and include information relating to components, contexts, user interface elements, data, and other parameters related to a current state of a client-server interaction.

BRIEF DESCRIPTION OF THE DRAWINGS

The description herein makes reference to the accompanying drawings, wherein like reference numerals refer to like parts throughout the several views.

DETAILED DESCRIPTION

Figure 1:
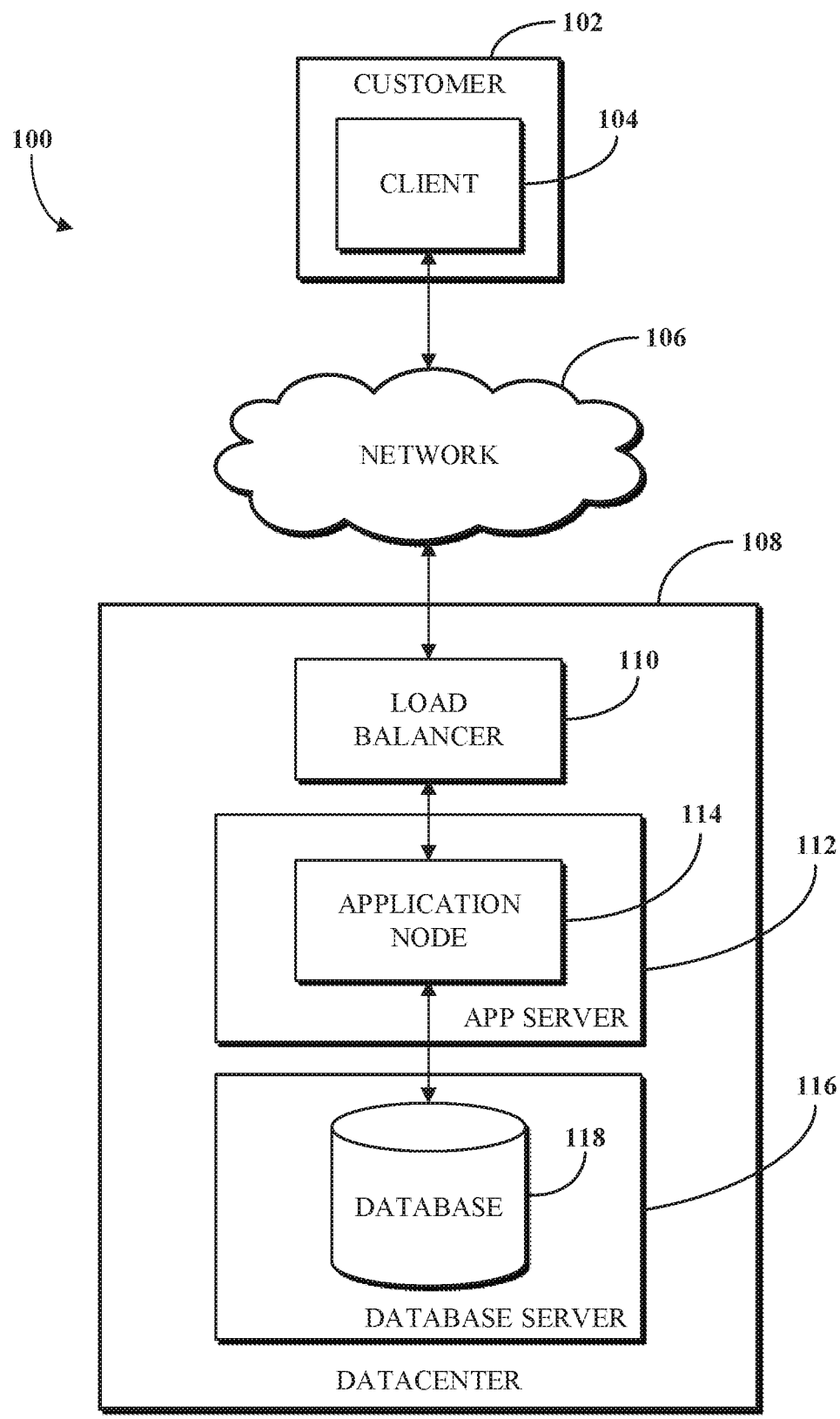
FIG. 1 is a block diagram of an example of an electronic computing and communications system.

In computing and communications networks, services may be provided by a set of instructions (e.g., code) running on servers (e.g., web servers, database servers, file servers, mail servers, or application servers). Some users, working on client devices, may write or modify a set of instructions that runs on a server to provide services. For example, customers of a platform-as-a-service (PaaS) cloud computing provider can customize platform software to deliver application software based on their particular service and business management needs. For example, a customer can customize the platform software by adding or modifying scripts for executing routines related to services deliverable by the customer, but which are not native to the platform software. Allowing PaaS customers to develop software implementing their customization of platform software from a client device can present challenges. When humans write or modify a set of instructions, bugs (i.e., coding errors) may occur. Users often need to find bugs in a set of instructions written by themselves or others. A debugger interface that allows a user to pause execution of the set of instructions and examine the state of variables may help the user to efficiently find bugs and fix the set of instructions.

Debugging a set of instructions that is running on a remote device may present challenges. For example, remote debugging via network communications may be subject to unplanned disconnections and/or significant latency introduced by a network communications environment (e.g., caused by limitations imposed by a network firewall). For example, there may be challenges with regard to sharing computing resources, among many users and/or threads, on a server running a set of instructions being debugged, which may run slow and be subject to frequent paused states.

In some implementations (e.g., some of the implementations described in relation to FIG. 4), resource sharing among threads, including threads running a set of instructions with a debugger, is facilitated by including a pause marker (e.g., a semaphore or a mutex) for a session data structure storing state information for communications with a client device controlling one or more debugger instances running on a server. For example, a pause marker may be used by the server to prevent a case where two debugger instances from the same user are paused concurrently and/or to facilitate resuming execution of a set of instructions being debugged from a pause based on a user command issued via another transaction in the session.

For example, using a pause marker may enable a thread-safe control channel for managing the state of the debugged transaction using debug control transactions that can run normally while execution of a set of instructions for a debugged transaction is paused. The paused transaction is able to safely release its lock on a session data structure while it is paused, allowing other transactions, including debug control transactions, to be executed using the session data structure. This configuration may allow use of standard PaaS server behaviors (especially access control, which may include scripts) within debug control channel transactions.

In some implementations (e.g., some of the implementations described in relation to FIGS. 4-6), event-based messaging is used to reduce latency experienced when using a debugger instance controlled from a client device. For example, when a set of instructions that is being executed in a debug mode reaches a breakpoint, execution of the set of instructions may be paused, and a message indicating that the breakpoint was reached may be sent to the client device without waiting for the client device to send a subsequent request for that information. In this manner, delays associated with waiting for a client request to be issued after a debugger instance pauses on the server may be avoided. In some implementations, a server running a debugger instance may determine when a client device that requested the debugger instance to run has become disconnected from the server and may terminate the debugger instance or allow the set of instructions being debugged to finish running in a non-debug mode (e.g., a production mode) where it skips remaining breakpoints. In this manner, limited computing resources on a server may be conserved in the presence of debugging instances running in response to network communications from client devices.

In some implementations (e.g., some of the implementations described in relation to FIG. 3), user debugging, from a client device, of a set of instructions (e.g., a script) running on a server may be facilitated by communications between a debugger instance running on the server and a debugger interface running on the client device. For example, a debugger instance running on the server may identify a set of instructions to be debugged based on a request from the client device and execute the identified set of instructions, enabling execution to be paused at breakpoints associated with instructions of the identified set of instructions and the values of variables used by the identified set of instructions to be determined. For example, a debugger interface running on a client device may provide user interface (e.g., including the display region 910 of FIG. 9) to the user and enable the user to control (e.g., by setting breakpoints and/or issuing step commands) execution of the identified set of instructions and to examine the state (e.g., including the values of variables used by the identified set of instructions) when execution on the server is paused. For example, commands to control execution of the identified set of instructions may be passed from the debugger interface on the client device to the debugger instance on the server in requests transmitted via network communications. For example, state information about the identified set of instructions being debugged may be passed from the debugger instance on the server to the debugger interface on the client device via network communications.

In some implementations, a set of instructions identified for debugging may include, for example, interpretable text (e.g., JavaScript), compiled code (e.g., compiled Java or C code), bytecode, and/or other computer-executable instructions. In some implementations, an instruction of a set of instructions may be executed by interpreting (e.g., using a JavaScript interpreter) that the instruction.

Implementations of this disclosure provide technological improvements particular to computer networks, for example, those concerning remotely programmable web applications. Computer network-specific technological problems, such as managing a session state to facilitate debugging of a set of instructions running on a server from a client device, can be wholly or partially solved by implementations of this disclosure. For example, the state of a session including transactions for one or more debugger instances may be managed in a thread-safe manner. The implementations of this disclosure introduce new and efficient improvements in the ways in which a state for a debugger stored in a client device may be synchronized with a state of the debugger running the set of instructions to be debugged on a server by using a low-latency, event-based messaging system.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of an application running on a customer device associated with the customer 102. As used herein, the term "software" can include, but is not limited to, applications, programs, instances, processes, threads, services, plugins, patches, application version upgrades, or any other identifiable computing unit capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108 and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a database 118, which can be accessible by an application executed on the application node 114. The database 118 may be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can be comprised of a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MM.

In some implementations, one or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

Platform software may be implemented by a PaaS service provider using executable instructions. The PaaS service provider can execute distinct instances of the platform software for respective customers, such that a customer can access its instance of the platform software by communicating with a server device executing the instance. In some implementations, an instance of platform software can be implemented using one or more application nodes and one or more database nodes, such as the application node 114 and database 118 shown in FIG. 1, wherein the application node 114 can implement a version of the platform software and the database 118 can store a version of platform data used by the version of the platform software and a version of user data created by a user of the instance. A customer may be enabled to customize the platform software by developing code (e.g., scripts) that are integrated with the platform software. For example, a customer may be provided with an interface for debugging scripts running on a PaaS service provider server (e.g., the application server 112) from a client device (e.g., the client 104).

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
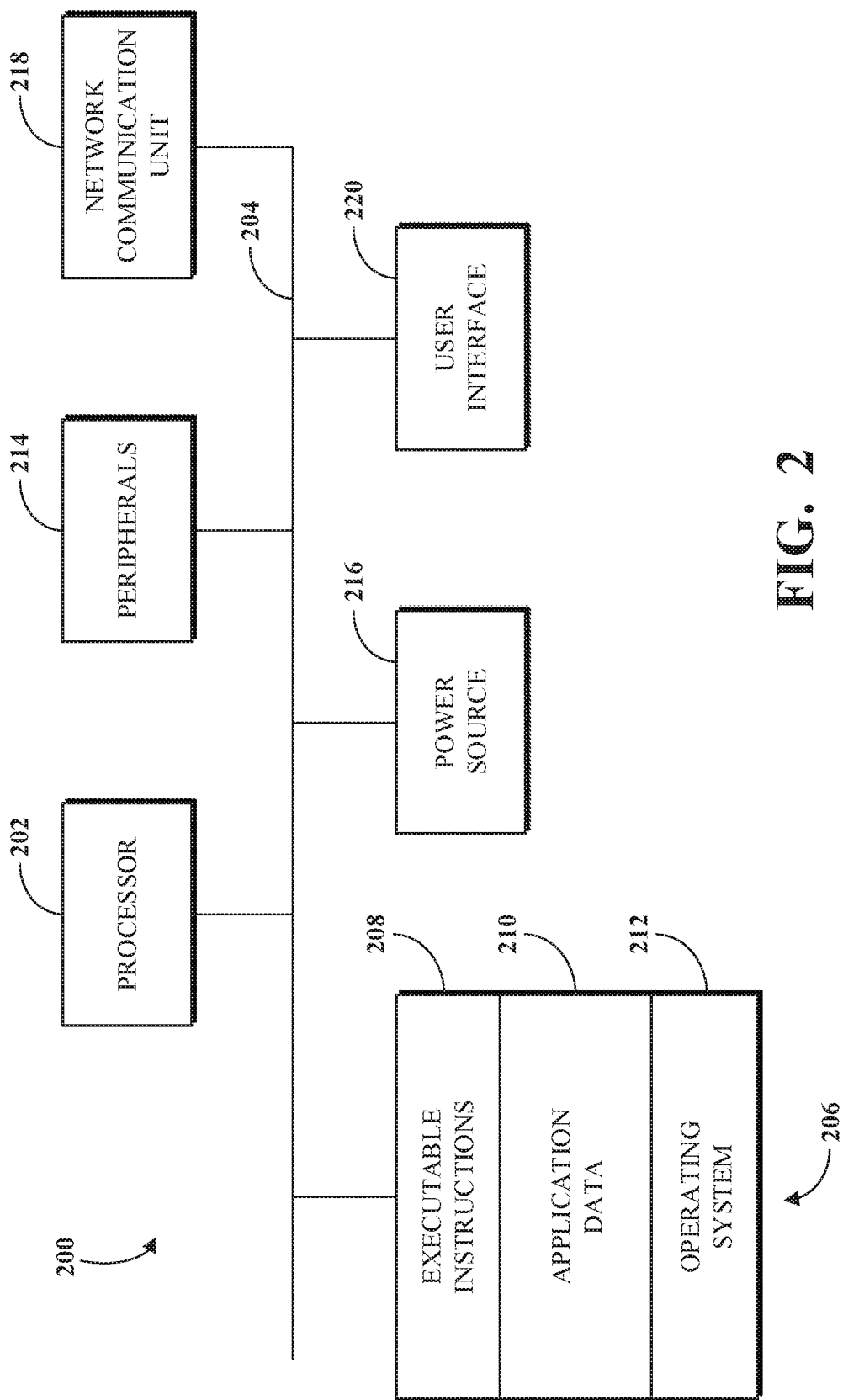
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include machine-readable code to execute a set of instructions in a debug mode with access to data for a session with a client device, transmit an indication to a client device that a breakpoint was reached when the set of instructions running in the debug mode is paused, or terminate or modify execution of the set of instructions running in the debug mode upon disconnection from a client device. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals 214 can be sensors or detectors, or devices containing any number of sensors or detectors, which can monitor the computing device 200 itself or the environment around the computing device 200. For example, a computing device 200 can contain a geo-spatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

Figure 3:
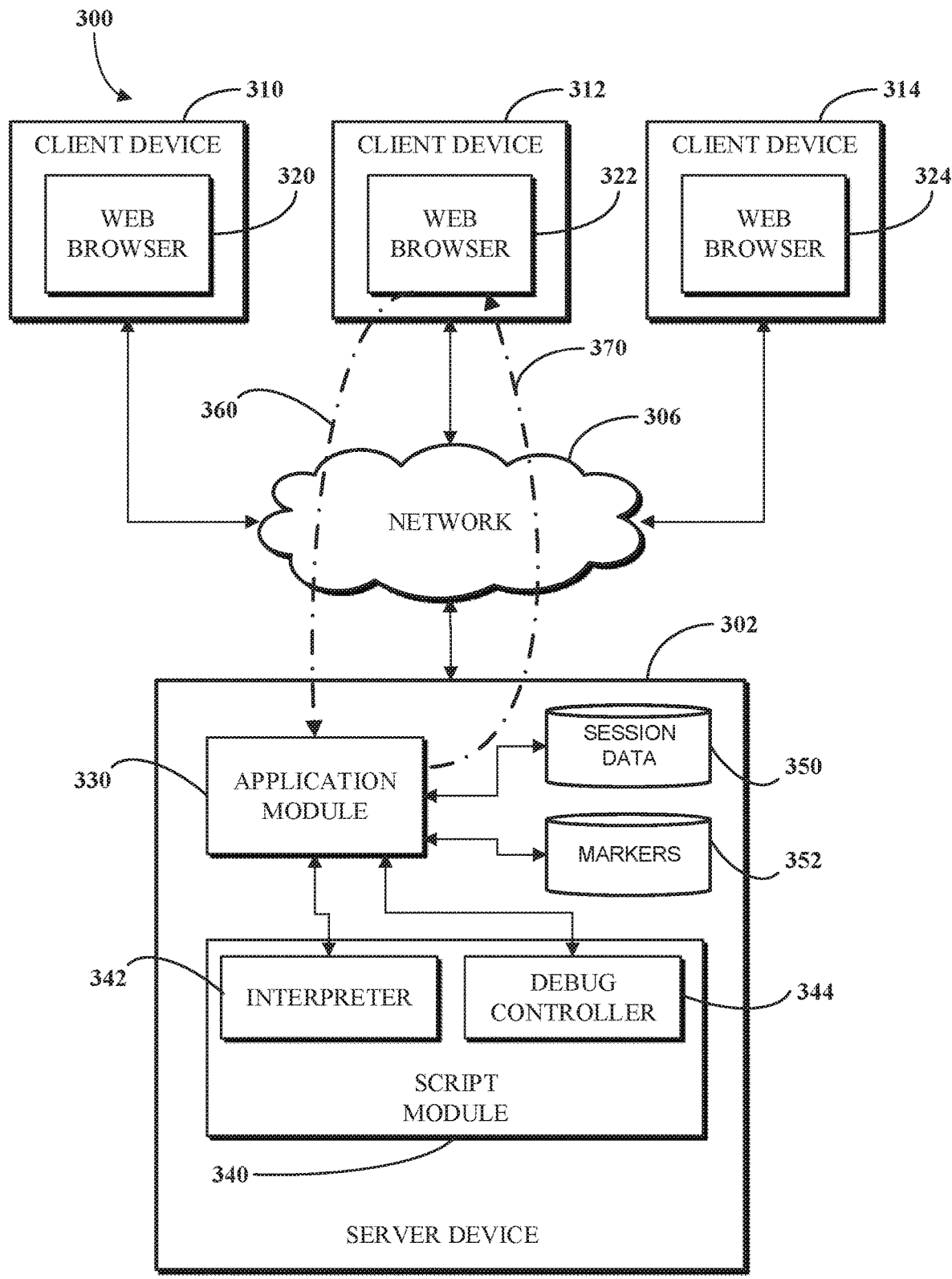
FIG. 3 is a diagram of example communications to facilitate debugging, from a client device, of a set of instructions running on a server device in an example electronic computing and communications system.

FIG. 3 is a diagram of example communications to facilitate debugging, from a client device, of a set of instructions (e.g., code) running on a server device in an example electronic computing and communications system 300. The system 300 may include a server device 302 that may communicate via a network 306 with client devices 310, 312, and 314. The client devices 310, 312, and 314 may include a user interface (e.g., the web browsers 320, 322, and 324) that facilitates communication with server devices, such as the server device 302. The server device 302 may include an application module 330 that provides services to users of client devices (e.g., the client device 312), including a capability to run a set of instructions (e.g., code) in a debug mode on the server device 302 and access a debugger interface on a client device (e.g., through the web browser 322).

For example, the client device 312 may be the client 104 as described in relation to FIG. 1. The web browser may be, for example, Chrome®, Firefox®, Safari®, or Internet Explorer®. For example, the network 306 may be the network 106 as described in relation to FIG. 1. For example, the server device 302 may be the application server 112 of FIG. 1. In some implementations, the application module 330 may be the application node 114 of FIG. 1. For example, the application module 330 may include a java virtual machine (JVM) running compiled java code to provide services to clients.

The application module 330 may pass scripts to a script module 340 for execution. For example, the script module may be a JavaScript engine (e.g., Rhino®). The script module 340 may include an interpreter 342 for interpreting lines of code from a script as part of executing the script. The script module 340 may include a debug controller 344 that enables line-by-line control of the execution of a script. For example, the application module 330 may control execution of a script on a line-by-line basis by using a debug API (application programming interface) provided by the debug controller 344. As a next line of the script for execution is processed, the application module 330 may receive a callback to a callback function that it previously registered with the script module 340 through the API provided by the debug controller 344. In some implementations, this callback function is a code (e.g., a compiled Java code running on a JVM) that implements debugger logic to enable a user at a client device (e.g., the client device 312) to debug a set of instructions (e.g., code) being executed on the server device 302.

The callback function implemented by the application module 330 may examine information about a script and/or a related debugger instance (e.g., the session data 350 and/or the markers 352) to determine if there is a breakpoint associated with the next instruction (e.g., a line of code) and whether, under the current circumstances, the execution of the script should be paused at the breakpoint. If an applicable breakpoint is detected, but it is determined that the breakpoint should be skipped, the callback function may issue a command through the debug API to execute this next line of the script. If an applicable breakpoint is detected and it is determined that execution should be paused at the breakpoint, the callback function may issue a command through the debug API to pause execution at this next line of the script or withhold (for the time being) a command to execute this next line of the script. In some implementations, the application module 330 may use this callback function to determine that a breakpoint will be skipped if, for example, a limit on the number of concurrent debug instances using resources (e.g., a session data structure or a processor) would be exceeded or a user of a debug instance lacks permission to access the instruction (e.g., a line of code) associated with the breakpoint.

In an example scenario, a user of the client device 312 may use a browser to open a session with the application module 330 running on the server device 302. One or more requests 360 may then be transmitted from the client device 312 to the server device 302 to initiate and control the debugging of a script that will run on the server device 302. For example, a user may issue a command (e.g., by clicking a debugger icon or selecting a menu option) in the web browser 322 to indicate that a debugger should be started, which may cause a request 360 to be transmitted to the server device 302. When the request is received by the server device 302, the application module 330 may identify a set of instructions (e.g., a server-side script) that will be executed in a debug mode in response to the request. The application module 330 may initiate execution of the set of instructions, for example, by passing an identified script to the script module 340 and using a debug API provided by the debug controller 344 to control the execution of the script on a line-by-line basis. Execution of the script may continue until the application module 330 determines that a line or instruction of a script corresponding to a first breakpoint has been reached.

The application module 330 may check to determine if conditions required for pausing on the breakpoint are satisfied. For example, the application module 330 may determine whether too many threads would be concurrently paused using the session data 350 associated with the request 360, by checking a pause marker 352 (e.g., a semaphore) associated with the session data 350. For example, the application module 330 may determine whether a user associated with the request has permission to access the instruction associated with the breakpoint (e.g., read permission for the script file in which the instruction occurs). Where the conditions are satisfied, the application module 330 may cause execution of the script to be paused (e.g., using the debugger API of the script module 340). In some implementations, the application module 330 may then transmit a message 370 to the client device 312 that indicates that a breakpoint has been reached, without waiting for a new request from the client device, so that the new state of the paused script may be promptly synchronized (e.g., as part of the session data 350) with its corresponding representation on the client device for display to a user (e.g., in the web browser 322).

The markers 352 may be stored separately from the session data they are associated with (e.g., they may be stored in a table of markers for registered sessions active on the server device 302). In some implementations, the markers 352 may be stored as a part of the session data to which they pertain (e.g., a marker may include one or more fields stored in a session data record). The session data 350 and/or the markers 352 may be stored in memory on the server device 302 (e.g., in the memory 206). In some implementations (not shown in FIG. 3), the session data 350 and/or the markers 352 are stored in memory on another device (e.g., the database server 116) and accessed by the application module 330 from the server device 302 via network communications.

Subsequent requests 360 may be transmitted from the client device 312 to the server device 302 to continue the debugging of the script. For example, the requests 360 may be sent to step into, step over the next line of the script, or resume execution of the script until the next breakpoint is reached. For example, a step operation may be implemented by generating a temporary breakpoint associated with an instruction immediately after the next instruction in the script, so that the execution will pause again after executing the next instruction. Messages updating the client device 312 about changes in the status of the debugger may be transmitted by the server device 302 as the new information becomes available. If at some point the client device 312 becomes disconnected from the server device 302 (e.g., due to a crash of the client device or a network service disruption), the server device 302 may determine that a debugger interface on the client device 312 is no longer available to control execution of the script, and in response the application module 330 may either terminate the execution of the script that was being debugged or cause the script to continue running in a non-debug mode (e.g., a production mode) where it skips remaining breakpoints and consumes less computing resources on the server device 302.

Many different users (e.g., users of multiple client devices 310, 312, and 314) may share the resources of the server device. The application module 330 may allow multiple users to debug their own transactions without affecting each other. In some implementations, the application module only allows users (e.g., developers) to see and interact with items related to their current debugging session (e.g., breakpoints, call stack, transactions, or status). The application module 330 may prevent one developer from seeing or modifying a debug instance of another user. Certain special users (e.g., administrators), however, may be enabled to impersonate another user, open the debugger interface, and debug transactions generated by the impersonated user.

Because the computing resources (e.g., processor time) on the server device are limited and executing a set of instructions in a debug mode may consume more of the computing resources and/or degrade performance relative to running in non-debug mode, it may be advantageous to limit the number of concurrent threads running in a debug mode, such as by server, by session, or by user. By default, the application module 330 may support debugging a limited number (e.g., one fourth of a number of semaphores on the instance) of concurrent transactions. Users may, for example, be limited to one or two debug sessions. Certain special users (e.g., administrators) may be able to specify the number of concurrent transactions the system can debug by setting a configuration parameter.

Figure 4:
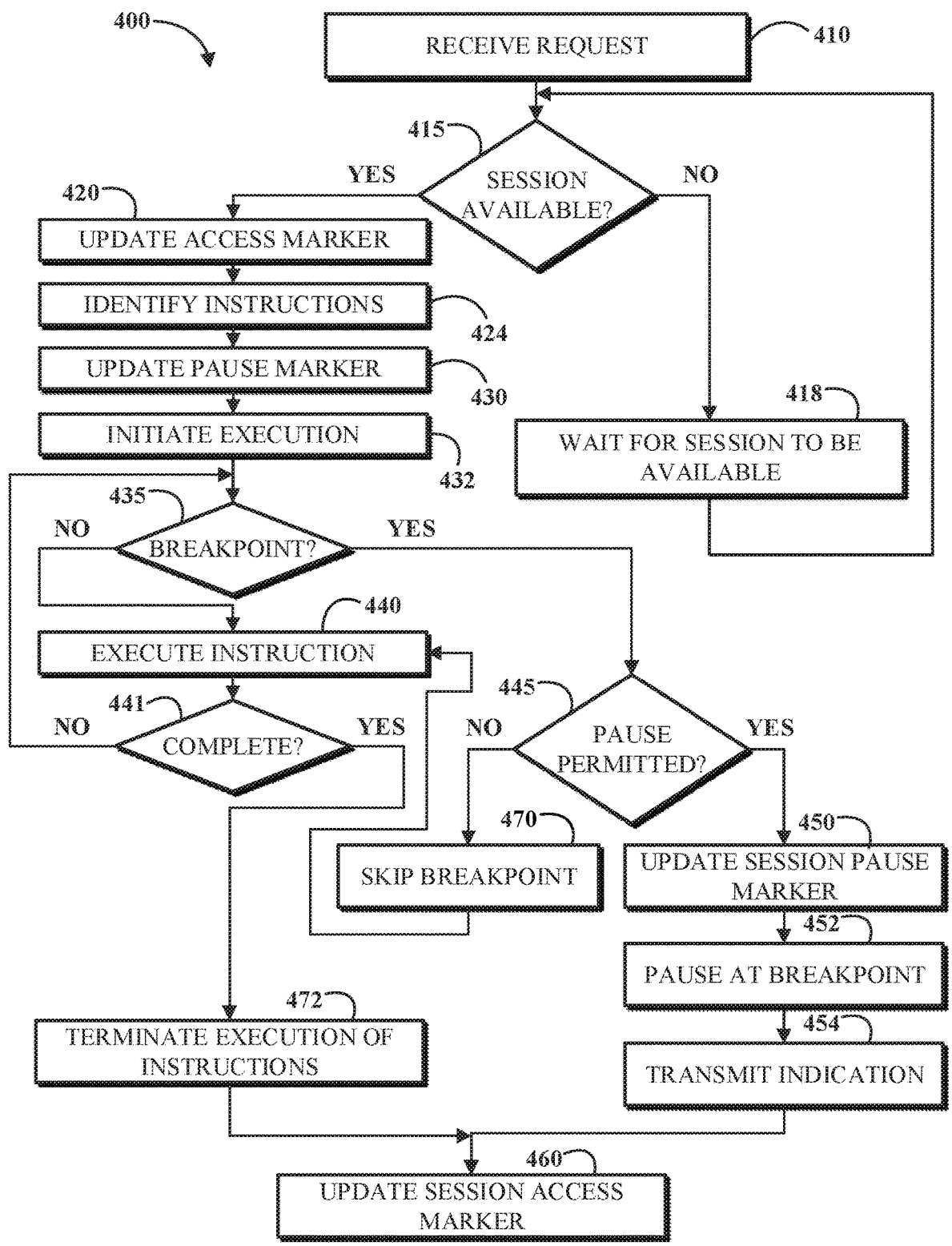
FIG. 4 is a flowchart illustrating an example of a technique for executing a set of instructions to be debugged via a session with a client device.

FIG. 4 is a flowchart illustrating an example of a technique 400 for executing a set of instructions to be debugged via a session with a client device in an electronic computing and communications system, such as the system 100 as generally illustrated in FIG. 1. In some implementations, the technique 400 can be executed using computing devices, such as the systems, modules, and devices described with respect to FIGS. 1, 2, and 3. In some implementations, the technique 400 can be performed, for example, by executing a machine-readable code, such as instructions or programs written to JavaScript, C, or other such computer programming languages. The steps, or operations, of the technique 400 or any other method, process, or algorithm described in connection with the implementations disclosed herein can be implemented directly in hardware, firmware, software executed by hardware, circuitry, or a combination thereof.

The technique 400 may include, when executing a set of instructions in a debug mode, determining (at operation 445), based on a second marker (e.g., a semaphore), that pausing execution of the set of instructions using a data structure (e.g., a session data structure) is permitted and, responsive to this determination, pausing (at operation 452) execution of the set of instructions before executing an instruction associated with a breakpoint, and updating (at operation 450) the second marker to indicate that execution of the set of instructions is paused using the data structure.

The technique 400 may include receiving (at operation 410) a request from a client device (e.g., the client device 312). In some implementations, the request may be a command to launch and/or control a debugger instance to execute a set of instructions (e.g., code) in a debug mode. For example, the request received (at operation 410) may be a request to launch a debugger instance that explicitly specifies a set of instructions (e.g., a script) to be run in a debug mode. For example, the request may be to perform a service (e.g., serve a webpage or update a database record) which causes a server device (e.g., the server device 302) receiving (at operation 410) the request to execute a set of instructions (e.g., a script) (after obtaining control of the session at operations 415 and 420) that has been previously marked for execution in a debug mode, for example, by inserting one or more breakpoints associated with instructions of the set of instructions. In some implementations, the request is received (at operation 410) by a server (e.g., the server device 302) via a network interface (e.g., the network communication unit 218).

One or more debug control transactions may be executed in order to control a debugged transaction that will execute a set of instructions associated with one or more breakpoints in a debug mode and may be paused. Debug control transactions may utilize the session in the same was as a debugged transaction that is of primary interest. For example, when a request is received that includes a debug command to resume (e.g., a resume or step command) execution of a debugged transaction that is paused (e.g., at a breakpoint), the request may cause a debug control transaction to be executed using technique 400. The debug control transaction may execute a set of instructions (at operation 440) that notifies the paused debugged transaction that it should resume execution as soon as possible. For example, the debug control transaction may notify the debugged transaction using a semaphore or by otherwise writing to a data structure shared by the two transactions (e.g., the session data structure). The debugged transaction may then attempt (at operation 415) to acquire the session lock, but will be prevented because the debug control transaction currently holds the session access marker that it acquired (at operation 420). The debugged transaction will therefore wait (at operation 418) to acquire that session lock. The debug control transaction will continue execution of its instructions to completion (at operation 472), at which point it updates (at operation 460) the session access marker to release the session lock. With the session lock now released, the debugged transaction is able to acquire the session lock by updating (at operation 420) the session access marker and proceed with execution of its set of instructions using the technique 400. In this manner, the request including the command to resume that was received (at operation 410) may cause the debugged transaction to resume execution, using the technique 400, of the set of instructions that is associated with one more breakpoints.

The technique 400 may include determining (at operation 415), based on an access marker, whether a data structure is available for use in executing the set of instructions. In some implementations, the data structure is a session data structure for a session associated with a request received (at operation 410). For example, the access marker may include a mutex for a session data structure that is associated with a request received (at operation 410). In some implementations, the access marker may include a semaphore for a session data structure that is associated with a request received (at operation 410).

If (at operation 415) it is determined that the data structure is not available for use in executing the set of instructions, a thread that will execute the set of instructions may wait (at operation 418) for the data structure to become available. For example, where the access marker includes a mutex for a session data structure, a loop may be entered to continue checking periodically (at operation 415) if the mutex for the session data structure is available. For example, where the access marker includes a semaphore for a session data structure, a wait or acquire function may be utilized (at operation 418) for the semaphore.

When (at operation 415) it is determined that the data structure is not available for use in executing the set of instructions, markers for the session marker may be updated (at operation 420). In some implementations, responsive to the determination (at operation 415) that the data structure is available, the access marker may be updated (at operation 420) to indicate that the data structure (e.g., the session data structure) is in use. For example, a mutex for the session data structure may be locked. For example, a semaphore for the session data structure may be acquired.

A set of instructions to be executed may be identified (at operation 424). For example, responsive to receiving (at operation 410) the request and taking control of the session, a server device (e.g., the server device 302) may use an explicit specification in the request to identify (at operation 424) a set of instructions (e.g., a script) to be executed, which may be associated with one or more breakpoints. For example, the request may include a command (e.g., resume, step over, step into, or step out) to control a debugger instance already executing a set of instructions in a debug mode on the server receiving (at operation 410) the request. In some implementations, the request may be to perform a service (e.g., serve a webpage or update a database record) which causes a server device (e.g., the server device 302) receiving (at operation 410) the request to identify (at operation 424) a set of instructions (e.g., a script) to be executed that has been previously marked for execution in a debug mode, for example, by inserting one or more breakpoints associated with instructions of the set of instructions. The presence of debug configuration information (e.g., a breakpoint or a debug mode enable flag) associated with (e.g., stored in a database or file with a reference to or in the same location as the set of instructions) the set of instructions to be executed in providing the requested service may automatically trigger a debugger instance that is not explicitly called for in the request message that is received (at operation 410).

It may be determined (at operation 430) that execution of a set of instructions will be continued from a paused state (e.g., in response to a resume or step command). For example, this determination may be based on information in the request received (at operation 410), for example, data identifying a debug command from a user (e.g., resume, step over, step into, step out). For example, this determination may be based on information in a notification from a debug control transaction that has been executed in response to the request received (at operation 410). Responsive to the determination (at operation 430) that execution of a set of instructions will be continued from a paused state, a pause marker may be updated (at operation 430) to indicate that execution of the set of instructions is no longer paused using the data structure. In some implementations, the pause marker may include a semaphore. For example, the pause semaphore may be used to keep track of how many threads are currently paused using the session data structure. In some implementations, the pause marker for a session is a binary semaphore that indicates whether a thread using the session is paused. In some implementations, the pause marker may be updated (at operation 430) by unlocking a mutex included in the pause marker. In some implementations, the pause marker may be updated (at operation 430) by signaling or releasing a semaphore included in the pause marker.

Execution of the set of instructions may be initiated (at operation 432). In some implementations, the set of instructions is a script identified (at operation 424), and execution of the script includes interpreting instructions of the script using a script interpreter executed by a processor (e.g., the processor 202). For example, the script interpreter may include a debug interface that permits an application executed by the processor to pause and continue execution of the script by interfacing with the debug interface. For example, a script identified (at operation 424) may be passed by the application module 330 to the script module 340 to initiate (at operation 432) execution. For example, a command (e.g., step or resume) may be passed through a debug API to the script module 340 to initiate (at operation 432) execution of a script previously passed to the script module 340.

A next instruction in the identified (at operation 424) set of instructions may then be checked (at operation 435) to determine whether there is a breakpoint that should be enforced for the next instruction. In some implementations, a table of breakpoints associated with the set of instructions may be maintained and checked (at operation 435). In some implementations, breakpoints are associated with a user and can be enforced when that user or another user impersonating that user is executing the set of instructions in a debug mode. This may allow many users to share and debug a set of instructions (e.g., a script) without interfering with one another. For example, where a breakpoint is found (e.g., in a table of breakpoints) that is associated the next instruction, the breakpoint may be checked to determine whether the breakpoint applies for a user associated with the request received (at operation 410). In some implementations, a check may be performed to determine whether a user is permitted to access the next instruction (e.g., has read permissions for a file storing the next instruction). A breakpoint may be skipped (e.g., as described in relation to the techniques 700 and/or 800 of FIGS. 7 and 8) if the user is determined to be not permitted to access the next instruction. For example, the application module 330 may determine (at operation 435) whether there is a breakpoint that should be enforced for the next instruction.

If (at operation 435) there is no applicable breakpoint for the next instruction, the next instruction may be executed (at operation 440). For example, the next instruction may be executed (at operation 440) when the application module 330 issues a command to the script module 340 through a debug API provided by the debug controller 344. For example, the script module 340 may use the interpreter 342 to interpret the next instruction and execute the next instruction.

Next, it may be determined (at operation 441) whether execution of the identified (at operation 424) set of instructions is complete. For example, execution may be completed when the last instruction in the set of instructions (e.g., a script) has been executed. In some implementations, completion may be determined based on the occurrence of an external event, for example, a determination that a debugger interface on a client device has become unavailable (as described in relation to the technique 600 of FIG. 6). In some implementations, completion may be triggered by an external command, for example, a halt or reset command from an administrator. If (at operation 441) execution of the set of instructions is not complete, a next instruction may be considered by checking (at operation 435) for a breakpoint. For example, a callback function registered by the application module 330 with the script module 340 may be run to consider the next instruction.

If (at operation 435) there is an applicable breakpoint for the next instruction, a pause marker may be checked (at operation 445) to determine, based on the pause marker, whether pausing execution of the identified (at operation 424) set of instructions using the data structure is permitted. In some implementations, the pause marker may be a mutex or a semaphore associated with the session data structure. Some implementations may determine (at operation 445), based on the pause marker, whether a number of concurrently paused transactions using the data structure has exceeded a limit. A system implementing the technique 400 (e.g., the server device 302) may impose a limit on the number of transactions executing sets of instructions (e.g., code, scripts, etc.) that may be paused concurrently using the session data structure. For example, the pause marker may include a semaphore that maintains a count of concurrently paused transactions that are using the session data structure, or, equivalently, a count of available slots for transactions to pause using the session data structure. For example, this count maintained in a semaphore may be compared to a limit (e.g., one or another limit imposed by a system administrator). Some implementations may determine (at operation 445), based on the pause marker, whether there is a paused execution of instructions using the data structure. For example, a system (e.g., the server device 302) may limit the number of concurrently paused transactions for the session data structure to one, the pause marker may include a binary semaphore, and examining the binary semaphore may determine (at operation 445) whether another thread or transaction is currently paused using the session data structure. For example, the application module 330 may determine (at operation 445), based on the pause marker, whether pausing execution of the identified (at operation 424) set of instructions using the session data structure is permitted.

Responsive to determining (at operation 445) that pausing execution of the set of instructions using the data structure is permitted, the pause marker may be updated (at operation 450) to indicate that execution of the first set of instructions is paused using the data structure; execution of the set of instructions may be paused (at operation 452) before executing an instruction associated with the breakpoint under consideration; and the access marker may be updated (at operation 460) to indicate that the data structure is available.

The pause marker may be updated (at operation 450) by performing a wait or acquire method for a semaphore included in the pause marker. In some implementations, the pause marker may be updated (at operation 450) by locking a mutex included in the pause marker. In some implementations, updating (at operation 450) the pause marker includes writing an identifier of a thread (e.g., the thread executing the identified set of instructions in a debug mode) to the pause marker.

For example, execution of the identified set of instructions may be paused (at operation 452) to provide an opportunity for a user to examine the debugger state (e.g., variables used by the set of instructions) and/or input commands for continued execution in a debug mode. In some implementations, execution of the identified set of instructions is paused (at operation 452) by issuing or withholding a command to a script engine through a debug API. For example, the application module 330 may pause (at operation 452) execution of a script by issuing a command to the script module 340 through its debug API provided by the debug controller 344, where the command may cause the script module 340 to enter a pause state. For example, the application module 330 may pause (at operation 452) execution of a script by withholding a command to the script module 340 through its debug API provided by the debug controller 344, where the command would cause the script module 340 to execute the next instruction.

An indication that the breakpoint was reached may be transmitted (at operation 454) to the client device for presentation to a user. For example, the server device 302 may transmit (at operation 454), via a network interface (e.g., the network communication unit 218), an indication to the client device 312 that the breakpoint was reached. The client device 312 may be configured to present (e.g., using the web browser 322) an indication to a user that the breakpoint was reached. For example, the client device may display a pop-up window notifying a user that the breakpoint was reached and opening or offering to open a debugger interface window to facilitate user debugging of the identified set of instructions. In some implementations, a message including the indication may include information about the breakpoint and the current call stack for the set of instructions being executed. In some implementations, the indication is transmitted (at operation 454) after the breakpoint is reached and before a new request is received from the client device. In this manner (e.g., as discussed in relation to the technique 500 of FIG. 5), delays from waiting for a client device to request an update after the breakpoint is reached may be avoided.

After pausing or terminating the execution of the identified set of instructions, the access marker may be updated (at operation 460) to make the data structure available to other threads or transactions. For example, this may allow transactions initiated by a user to control the debugger instance (e.g., resuming, stepping, or retrieving the value of a variable used by the set of instructions), as well as other unrelated user transactions, to be processed using a session data structure while the execution of the identified set of instructions is paused. In some implementations, the access marker may be updated (at operation 460) by performing a signal or release method for a semaphore included in the access marker. In some implementations, the access marker may be updated (at operation 450) by unlocking a mutex included in the access marker.

Responsive to the determination (at operation 445) that pausing execution of the set of instructions using the data structure is not permitted, the breakpoint may be skipped (at operation 470) by executing (at operation 440) the instruction associated with the breakpoint without pausing execution of the identified set of instructions. For example, the application module 330 may skip (at operation 470) the breakpoint by issuing a command to the script module 340 through the debug API provided by the debug controller 344, where the command causes the script module 340 to execute the next instruction, which is associated with the breakpoint.

If (at operation 441) execution of the set of instructions is complete, execution of the identified set of instructions may be terminated (at operation 472). For example, the application module 330 may terminate (at operation 472) execution of the set of instructions (e.g., a script) by issuing a termination command to the script module 340. After termination (at operation 472) of execution, the session access marker may be updated (at operation 460).

In some implementations, the technique 400 includes checking (at operation 445) a marker associated with a session to determine if another thread using the session is paused, and, if another thread using the session is paused, executing (at operation 440) the set of instructions without pausing, and, if no other thread using the session is paused, executing (at operation 440) the set of instructions until an instruction of the set of instructions associated with a breakpoint is reached, wherein execution of the set of instructions is paused (at operation 452) responsive to reaching the breakpoint.

In some implementations (not shown in FIG. 4), the technique 400 may be modified so that a debugged transaction continues to hold a pause marker after it resumes execution and until the debugged transaction is terminated. Instead of updating (at operation 430) the pause marker when a paused transaction resumes, the pause marker may remain locked by a debugged transaction until that debugged transaction is terminated. For example, responsive to terminating (at operation 472) execution of the first set of instructions, a debugged transaction may update the pause marker to indicate that execution of the its set of instructions is no longer paused using the data structure. For example, the pause marker may be locked when a debugged transaction using the session reaches a first breakpoint during its execution and the pause marker may remain locked until that transaction completes execution or is otherwise terminated. This example handling of the pause marker may prevent another debugged transaction from locking the pause marker while the first debugged transaction is executing between subsequent breakpoints, and ensure that the first debugged transaction is able to finish debugging in the expected way once its first breakpoint has been reached.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. For example, the technique 600 of FIG. 6 may be used to terminate execution of the identified set of instructions responsive to determining that a debugger interface on the client device (e.g., the client device 312) is no longer available to control execution of the identified set of instructions. For example, the technique 600 of FIG. 6 may be used to, responsive to a determination that the session associated with the request has terminated, skip one or more remaining breakpoints associated with the identified set of instructions. For example, the technique 800 of FIG. 8 may be used to receive a request from the client device (e.g., the client device 312) to step into a function from the set of instructions; determine that a user (e.g., a user associated with the request) is not permitted to access the function (e.g., because the user lacks read permission for the file in which the a set of instructions for the function is stored); and, responsive to the determination that the user is not permitted to access the function, step over the function by executing the function without pausing execution of the set of instructions. For example, in an implementation, when it is determined (at operation 445) that pausing execution of the set of instructions using the data structure is not permitted, any remaining breakpoints associated with the identified set of instructions may be skipped by continuing execution of the first set of instructions in a non-debug mode (e.g., a production mode), where all breakpoints are disabled. For example, in an implementation, for threads executing a set of instructions that is not being debugged, operation 435 may be omitted and execution of the set of instructions may proceed to completion without checking for breakpoints. For example, in an implementation, for threads executing a set of instructions that is not being debugged, operation 430 may be omitted. For example, a debug control transaction, rather than the debugged transaction itself, may update (at operation 430) the pause marker after or as part of notifying the debugged transaction that it should resume execution in response a request including a resume command received (at operation 410) from a client device. Furthermore, one or more aspects of the systems and techniques described herein can be omitted.

Figure 5:
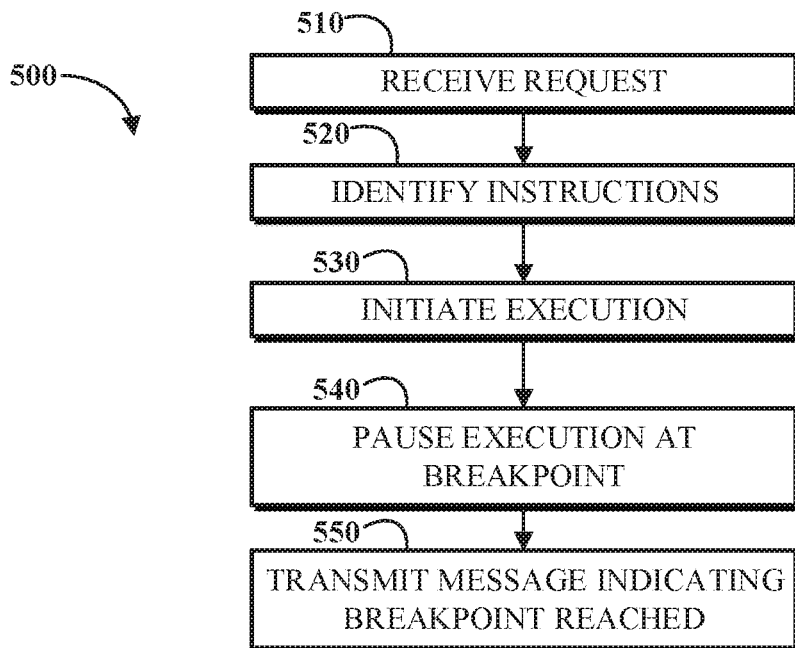
FIG. 5 is a flowchart illustrating an example of a technique for transmitting, to a client device, an indication that a breakpoint was reached when execution pauses at a breakpoint.

FIG. 5 is a flowchart illustrating an example of a technique 500 for transmitting, to a client device, an indication that a breakpoint was reached when execution pauses at the breakpoint in an electronic computing and communications system, such as the system 100 as generally illustrated in FIG. 1. In some implementations, the technique 500 can be executed using computing devices, such as the systems, modules, and devices described with respect to FIGS. 1, 2, and 3. In some implementations, the technique 500 can be performed, for example, by executing a machine-readable code, such as instructions or programs written to JavaScript, C, or other such computer programming languages. The steps, or operations, of the technique 500 or any other method, process, or algorithm described in connection with the implementations disclosed herein can be implemented directly in hardware, firmware, software executed by hardware, circuitry, or a combination thereof.

The technique 500 may include receiving (at operation 510) a request from a client device (e.g., the client device 312), identifying (at operation 520) a set of instructions (e.g., a script) to be executed, initiating (at operation 530) execution of the identified set of instructions, pausing (at operation 540) the execution at an instruction associated with a breakpoint, and transmitting (at operation 550), to the client device, a message that indicates that a breakpoint has been reached. For example, the message that indicates that a breakpoint has been reached may be transmitted (at operation 550) based on the server-side event of pausing execution on the breakpoint, rather than in response to a later request from the client device for an update. In some implementations, triggering the sending of an update message based on a server-side debugger event of a breakpoint being reached may offer performance advantages. For example, in some implementations, the delay associated with waiting for a client query with a request after the breakpoint is reached can be avoided, reducing the latency of a debugger instance for a set of instructions executed on the server and debugged from the client device. In some implementations, less computing resources (e.g., processor time on a server device and/or a client device and/or network bandwidth) are consumed compared to a system that relies on the client device polling the server device to retrieve updates on the state of a debugger instance.

The technique 500 may include receiving (at operation 510) a request from a client device (e.g., the client device 312). In some implementations, the request may be a command to launch and/or control a debugger instance to execute a set of instructions (e.g., code) in a debug mode. For example, the request received (at operation 510) may be a request to launch a debugger instance that explicitly specifies a set of instructions (e.g., a script) to be run in a debug mode. For example, responsive to receiving (at operation 510) the request, a server device (e.g., the server device 302) may use this specification in the request to identify (at operation 520) a set of instructions (e.g., a script) to be executed, which may be associated with one or more breakpoints. For example, the request may include a command (e.g., resume, step over, step into, or step out) to control a debugger instance already executing a set of instructions in a debug mode on the server receiving (at operation 510) the request. In some implementations, the request may be to perform a service (e.g., serve a webpage or update a database record) which causes a server device (e.g., the server device 302) receiving (at operation 510) the request to identify (at operation 520) a set of instructions (e.g., a script) to be executed that has been previously marked for execution in a debug mode, for example, by inserting one or more breakpoints associated with instructions of the set of instructions. The presence of debug configuration information (e.g., a breakpoint or a debug mode enable flag) in a file storing the set of instructions to be executed in providing the requested service may automatically trigger a debugger instance that is not explicitly called for in the request message that is received (at operation 510). In some implementations, the request is received (at operation 510) by a server (e.g., the server device 302) via a network interface (e.g., the network communication unit 218).

Execution of the set of instructions may be initiated (at operation 530). In some implementations, the set of instructions is a script identified (at operation 520), and execution of the script includes interpreting instructions of the script using a script interpreter executed by a processor (e.g., the processor 202). For example, the script interpreter may include a debug interface that permits an application executed by the processor to pause and continue execution of the script by interfacing with the debug interface. For example, a script identified (at operation 520) may be passed by the application module 330 to the script module 340 to initiate (at operation 530) execution. For example, a command (e.g., step or resume) may be passed through a debug API to the script module 340 to initiate (at operation 530) execution of a script previously passed to the script module 340.

Execution of the identified (at operation 520) set of instructions may be paused (at operation 540) when an instruction of the identified set of instructions associated with a breakpoint is reached. For example, a user may have previously associated a breakpoint with an instruction by opening a file (e.g., a text file) storing the instruction in a code editing interface (e.g., a text editor or a coding pane of a debugger interface) and clicking the gutter (e.g., a line along the left column of a display of text file contents) next to a line in the file corresponding to the instruction. This user action may set a breakpoint and associate the breakpoint with the instruction. In some implementations, the breakpoint and its association with the instruction may be encoded in a retrieved from a table of breakpoints stored in debug metadata included in or associated with a file encoding the set of instructions (e.g., a script).

For example, execution of the identified set of instructions may be paused (at operation 540) to provide an opportunity for a user to examine the debugger state (e.g., variables used by the set of instructions) and/or input commands for continued execution in a debug mode. In some implementations, execution of the identified set of instructions is paused (at operation 540) by issuing or withholding a command to a script engine through a debug API. For example, the application module 330 may pause (at operation 540) execution of a script by issuing a command to the script module 340 through its debug API provided by the debug controller 344, where the command may cause the script module 340 to enter a pause state. For example, the application module 330 may pause (at operation 540) execution of a script by withholding a command to the script module 340 through its debug API provided by the debug controller 344, where the command would cause the script module 340 to execute the next instruction.

As a precondition for pausing (at operation 540) at the breakpoint, a server device (e.g., the server device 302) may determine, based on a pause marker, that pausing execution using a session data structure is permitted. For example, the pause marker may include a mutex or a semaphore (e.g., a binary semaphore), which may be used to limit (e.g., to one at a time) the number of transactions or threads that may be concurrently paused (at operation 540) using the session data structure. For example, the technique 400 may be used to determine (at operation 445) whether, based on a pause marker, pausing execution using a session data structure is permitted. For example, as a precondition for pausing (at operation 540) at the breakpoint, a server device (e.g., the server device 302) may determine (at operation 445), based on a pause marker, that a number of concurrently paused transactions using a session data structure has not exceeded a limit.

A message that indicates that a breakpoint has been reached may be transmitted (at operation 550) to the client device. In some implementations, the message is transmitted (at operation 550) after the first breakpoint is reached and before a new request is received from the client device. For example, the message that indicates that a breakpoint has been reached may be transmitted via a Web Socket that was previously established between the client device (e.g., the client device 312) and a server device (e.g., the server device 302) that is implementing the technique 500. For example, the message that indicates that a breakpoint has been reached may be transmitted via a channel established by long polling from the client device (e.g., the client device 312). For example, the message that indicates that a breakpoint has been reached may be transmitted (at operation 550) to the client device (e.g., the client device 312) from a server device (e.g., the server device 302) via a network interface (e.g., the network communication unit 218).

Responsive to the message that indicates that a breakpoint has been reached, the client device (e.g., the client device 312) may display a pop-up window (e.g., in the web browser 322) to alert the user that the debugger instance on a server device has paused and is ready to be debugged through a debugger interface presented on the client device. In some implementations, the client device (e.g., the client device 312) may display a debugger interface (e.g., including the display region 910 of FIG. 9) to a user and transmit subsequent requests to the server device (e.g., the server device 302) to gather more information from a debugger instance (e.g., examine the values of variables used by the identified (at operation 520) set of instructions) and/or to control continued execution of the identified (at operation 520) set of instructions.

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. For example, the technique 600 of FIG. 6 may be used to terminate execution of the identified (at operation 520) set of instructions responsive to determining that a debugger interface on the client device (e.g., the client device 312) is no longer available to control execution of the identified set of instructions. For example, responsive to the determination that execution of the identified (at operation 520) set of instructions will be continued from a paused state, a pause marker may be updated (at operation 430) to indicate that execution of the set of instructions is no longer paused using a session data structure. Furthermore, one or more aspects of the systems and techniques described herein can be omitted.

Figure 6:
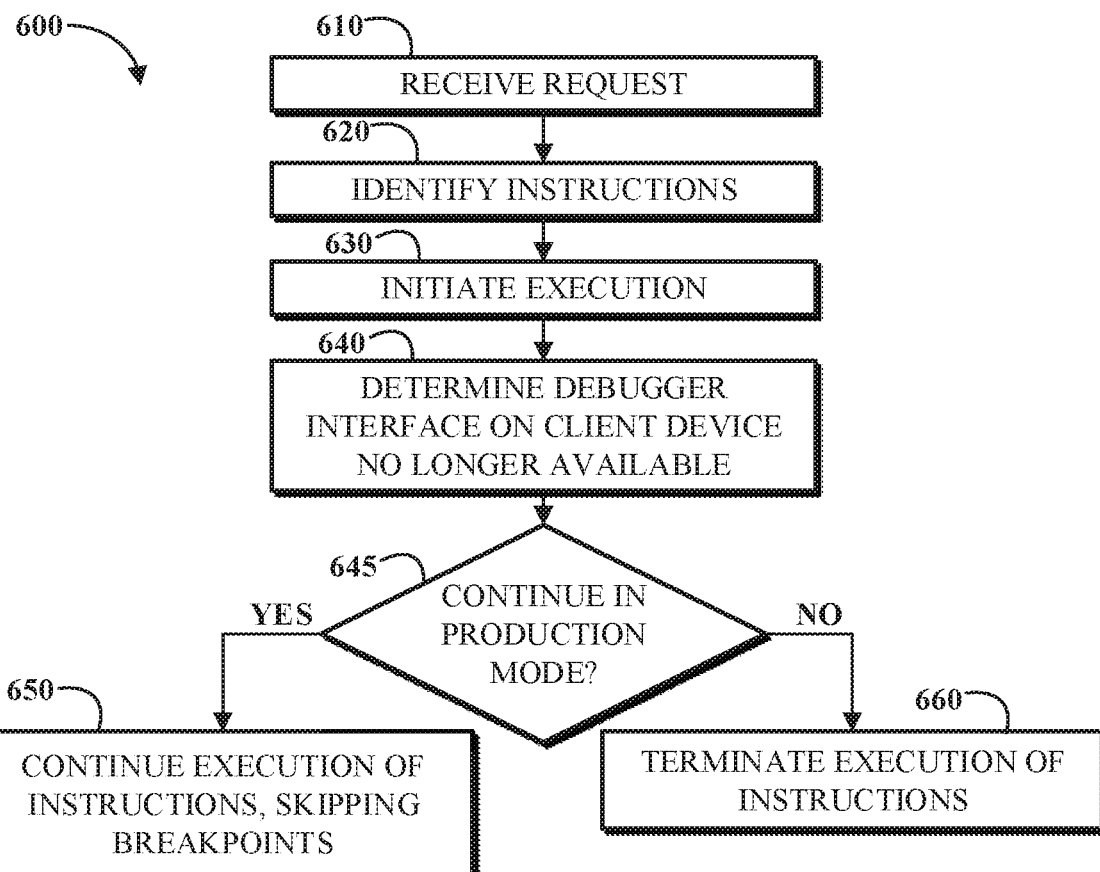
FIG. 6 is a flowchart illustrating an example of a technique for terminating or modifying the execution of a set of instructions running in a debug mode responsive to determining that a debugger interface on a client device has become unavailable to control execution of the set of instructions.

FIG. 6 is a flowchart illustrating an example of a technique 600 for terminating or modifying the execution of a set of instructions running in a debug mode upon determining that a debugger interface on a client device has become unavailable to control execution of the set of instructions in an electronic computing and communications system, such as the system 100 as generally illustrated in FIG. 1. In some implementations, the technique 600 can be executed using computing devices, such as the systems, modules, and devices described with respect to FIGS. 1, 2, and 3. In some implementations, the technique 600 can be performed, for example, by executing a machine-readable code, such as instructions or programs written to JavaScript, C, or other such computer programming languages. The steps, or operations, of the technique 600 or any other method, process, or algorithm described in connection with the implementations disclosed herein can be implemented directly in hardware, firmware, software executed by hardware, circuitry, or a combination thereof.

The technique 600 may include receiving (at operation 610) a request from a client device (e.g., the client device 312), identifying (at operation 620) a set of instructions (e.g., a script) to be executed, initiating (at operation 630) execution of the identified set of instructions, determining (at operation 640) that a debugger interface on a client device (e.g., the client device 312) is no longer available to control execution of the identified set of instructions, and, responsive to this determination, either continuing (at operation 650) execution of the identified (at operation 620) set of instructions in a non-debug mode or terminating (at operation 660) execution of the identified (at operation 620) set of instructions. In some implementations, triggering the termination or modification of the execution of a set of instructions upon the event of a disconnection detected by the server may offer performance advantages. For example, in some implementations, less computing resources (e.g., processor time and/or memory on a server device and/or network bandwidth) are consumed compared to a system that allows a set of instructions to be executed in a debug mode and potentially paused while a user is unavailable to act on the debug information and/or terminate a requested debug transaction.

The technique 600 may include receiving (at operation 610) a request from a client device (e.g., the client device 312). In some implementations, the request may be a command to launch and/or control a debugger instance to execute a set of instructions (e.g., code) in a debug mode. For example, the request received (at operation 610) may be a request to launch a debugger instance that explicitly specifies a set of instructions (e.g., a script) to be run in a debug mode. For example, responsive to receiving (at operation 610) the request, a server device (e.g., the server device 302) may use this specification in the request to identify (at operation 620) a set of instructions (e.g., a script) to be executed, which may be associated with one or more breakpoints. For example, the request may include a command (e.g., resume, step over, step into, or step out) to control a debugger instance already executing a set of instructions in a debug mode on the server receiving (at operation 610) the request. In some implementations, the request may be to perform a service (e.g., serve a webpage or update a database record) which causes a server device (e.g., the server device 302) receiving (at operation 610) the request to identify (at operation 620) a set of instructions (e.g., a script) to be executed that has been previously marked for execution in a debug mode, for example, by inserting one or more breakpoints associated with instructions of the set of instructions. The presence of debug configuration information (e.g., a breakpoint or a debug mode enable flag) in a file storing the set of instructions to be executed in providing the requested service may automatically trigger a debugger instance that is not explicitly called for in the request message that is received (at operation 610). In some implementations, the request is received (at operation 610) by a server (e.g., the server device 302) via a network interface (e.g., the network communication unit 218).

Execution of the set of instructions may be initiated (at operation 630). In some implementations, the set of instructions is a script identified (at operation 620), and execution of the script includes interpreting instructions of the script using a script interpreter executed by a processor (e.g., the processor 202). For example, the script interpreter may include a debug interface that permits an application executed by the processor to pause and continue execution of the script by interfacing with the debug interface. For example, a script identified (at operation 620) may be passed by the application module 330 to the script module 340 to initiate (at operation 630) execution. For example, a command (e.g., step or resume) may be passed through a debug API to the script module 340 to initiate (at operation 630) execution of a script previously passed to the script module 340.

The technique 600 may include determining (at operation 640) that a debugger interface on the client device (e.g., the client device 312) is no longer available to control execution of the identified (at operation 620) set of instructions. A debugger interface (e.g., including the display region 910)

on the client device may become unavailable to the server executing the identified (at operation 620) set of instructions for a variety of reasons. For example, a user may input an exit command in the debugger interface, causing the debugger interface to be terminated and become unavailable. For example, a web browser window or tab displaying the debugger interface may be closed, causing the debugger interface to be terminated and become unavailable. For example, a user may logout of a session with the server that is used by the debugger interface, causing the session to terminate and the debugger interface to become unavailable. For example, a user may logout of a session with the server that is used by the debugger interface, causing the session to terminate and the debugger interface to become unavailable. For example, the client device may be shut down or crash, causing the debugger interface to effectively terminate and to become unavailable. For example, a disruption in a network used for communications between the client device and the server may prevent communications for an extended period of time, causing the debugger interface become unavailable.

A determination (at operation 640) that a debugger interface on the client device (e.g., the client device 312) is no longer available may be based on receiving a message that indicates the debugger interface on the client device is no longer available. For example, the client device may send a message to the server indicating that the debugger interface is being terminated as part of its procedure for terminating the debugger interface (e.g., in response to a user exit command of the close of a browser window or tab). For example, the client device may send a message to the server indicating that the debugger interface is being terminated via a persistent messaging channel (e.g., an asynchronous messaging bus) that is associated with the debugger interface on the client device and the debugger instance on the server. In some implementations, a determination (at operation 640) that a debugger interface on the client device (e.g., the client device 312) is no longer available may be based on the expiration of timer. For example, a timeout timer associated with a session may expire if the client device becomes unavailable for an extended period of time (e.g., due to a crash of the client device or a network disruption), causing the session to terminate. For example, a timeout timer associated with a persistent messaging channel (e.g., an asynchronous messaging bus), which is associated with the debugger interface on the client device and the debugger instance on the server, may expire if the client device becomes unavailable for an extended period of time.

A server device (e.g., the server device 302) may determine (at operation 640) that a session associated with the received (at operation 610) request has terminated. The determination (at operation 640) that a session associated with the request has been terminated may be based on a message from a networking stack running on a server device (e.g., the server device 302) indicating that the session has been terminated. The session may have been terminated because, for example, a message was received from the client device (e.g., terminating the session), a timer expired (e.g., a timeout condition), or some other event occurred indicating that the session should be terminated. For example, a session may be terminated after a user of the client device closes a web browser window (e.g., in the web browser 322) that is associated with the session, the client device shuts down or crashes, or network disturbances prevent network communications between a server device and the client device for an extended period of time.

In some implementations, a user (e.g., an administrator) may configure a server device (e.g., the server device 302) and/or an application node (e.g., the application module 330) to modify or terminate the execution of a set of instructions that is being executed in a debug mode when a debugger interface on a client device controlling the execution of the set of instructions becomes unavailable (e.g., due to a disconnection). For example, an administrator for a server device (e.g., the server device 302) may set a configuration parameter to make this selection for all debug transactions running on the server device. In some implementations, an administrator may configure the behavior, for the case where a controlling debugger interface becomes unavailable, of these debugger instances differently depending on the type of service provided using the affected set of instructions (e.g., a script). For example, an administrator may configure a server device (e.g., the server device 302) to continue (at operation 650) execution in a production mode of scripts being executed to update a database. For example, an administrator may configure a server device (e.g., the server device 302) to terminate (at operation 660) scripts being executed to serve webpages.

Responsive to the determination (at operation 640) that a debugger interface on the client device is no longer available, if (at operation 645) the system is configured to continue executing sets of instructions (e.g., scripts) in a non-debug mode upon termination of an associated debugger instance, then execution of the identified (at operation 620) set of instructions may continue in a non-debug mode (e.g., a production mode) and remaining breakpoints associated with the identified (at operation 620) set of instructions may be skipped (at operation 650). For example, responsive to the determination that a session associated with the received (at operation 610) request has terminated, one or more remaining breakpoints associated with the identified (at operation 620) set of instructions may be skipped (at operation 650). For example, the application module 330 may continue (at operation 650) execution of the set of instructions (e.g., a script) by issuing a command to the script module 340 through the debug API provided by the debug controller 344 to disable the debug features for the remaining execution of the set of instructions by the script module 340. In some implementations, continuing (at operation 650) execution of the set of instructions in a non-debug mode may prevent indeterminate results (e.g., a partial, incomplete update of a record in a database) that may arise from abruptly halting execution of a script.

Responsive to the determination (at operation 640) that a debugger interface on the client device is no longer available, if (at operation 645) the system is configured to halt execution of sets of instructions (e.g., scripts) upon termination of an associated debugger instance, then execution of the identified (at operation 620) set of instructions may be terminated (at operation 660). In some implementations, debugging of the identified (at operation 620) set of instructions by a script interpreter may be terminated (at operation 660) by sending a command to a debug interface of a script interpreter to stop interpreting or debugging the identified set of instructions. For example, the application module 330 may terminate (at operation 660) execution of a script by sending a command to the script module 340 via the debug API provided by the debug controller 344, where the command causes the script module to stop interpreting the script using the interpreter 342 or debugging the script. In some implementations, terminating (at operation 660) execution of a set of instructions (e.g., a script) that was being debugged but is no longer being actively debugged may conserve computing resources (e.g., memory or processor time on a server device).

Although the technique 600 is shown as a series of operations for clarity, implementations of the technique 600 or any other technique, process, or algorithm described in connection with the implementations disclosed herein can be performed in various orders or concurrently. Additionally, operations in accordance with this disclosure can be performed with other operations not presented and described herein. For example, the technique 500 of FIG. 5 may be used to pause (at operation 540) execution of the identified (at operation 620) set of instructions when an instruction of the set of instructions associated with a breakpoint is reached and, after the breakpoint is reached and before a new request is received from the client device, transmit (at operation 550), to the client device, a message that indicates that a breakpoint has been reached. For example, the technique 400 of FIG. 4 may be used to execute the identified (at operation 620) set of instructions in a debug mode prior to determining (at operation 640) that a debugger interface on the client device is no longer available. For example, the techniques 700 and 800 of FIGS. 7 and 8 may be used to execute the identified (at operation 620) set of instructions in a debug mode while maintaining security for the set of instructions prior to determining (at operation 640) that a debugger interface on the client device is no longer available. Furthermore, one or more aspects of the systems and techniques described herein can be omitted.

Figure 7:
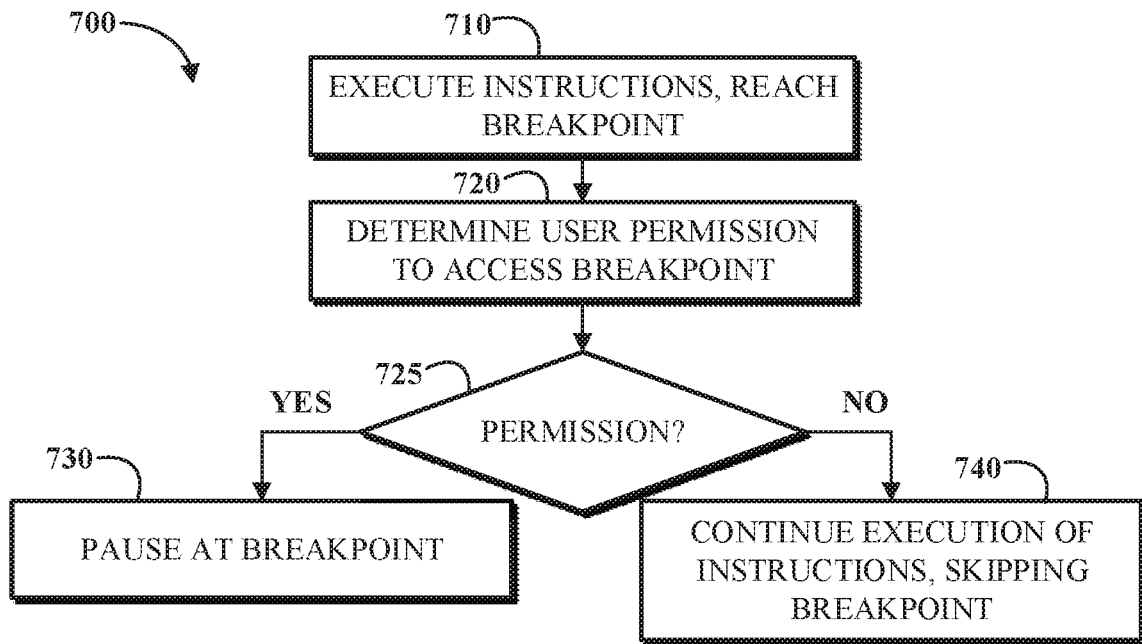
FIG. 7 is a flowchart illustrating an example of a technique for controlling access to sections of a set of instructions associated with breakpoints while running a debugger.

FIG. 7 is a flowchart illustrating an example of a technique 700 for controlling access to sections of a set of instructions associated with breakpoints while running a debugger in an electronic computing and communications system, such as the system 100 as generally illustrated in FIG. 1. In some implementations, the technique 700 can be executed using computing devices, such as the systems, modules, and devices described with respect to FIGS. 1, 2, and 3. In some implementations, the technique 700 can be performed, for example, by executing a machine-readable code, such as instructions or programs written to JavaScript, C, or other such computer programming languages. The steps, or operations, of the technique 700 or any other method, process, or algorithm described in connection with the implementations disclosed herein can be implemented directly in hardware, firmware, software executed by hardware, circuitry, or a combination thereof.

Users may not have permission to read all of the source code for the services they are able to access on a server. For example, the source code for certain functions that users utilize via an API may be hidden, for example, to protect against network security threats or to protect trade secrets. In most circumstances, a user sets a breakpoint by first accessing a source code file, so, in the normal course, a user should not be able to set breakpoints at instructions they lack permission to read. However, sometimes permissions change over time, and a user may inadvertently retain a breakpoint in code they no longer have access to read. Also, there may be ways to hack a breakpoint table to gain access to code stored in files the user lacks permission to read. For example, the technique 700 may provide another level of security to prevent inadvertent or malicious access to instructions without permission using breakpoints and a debugger instance on a server.

The technique 700 may include executing (at operation 710) a set of instructions and reaching a breakpoint; determining (at operation 720) whether a user has permission to access an instruction associated with the breakpoint; and, if (at operation 725) the user has permission, pausing (at operation 730) execution of the set of instructions at the breakpoint, or, if (at operation 725) the user does not have permission, continuing (at operation 740) execution of the set of instructions by skipping the breakpoint. In some implementations, by continuing execution and skipping a breakpoint associated with an instruction that a user lacks permission to read, the security of portions of the set of instructions (e.g., a script) may be protected.

A set of instructions may be executed (at operation 710) in a debug mode until the next instruction is associated with a breakpoint. For example, the technique 400 of FIG. 4 may be implemented by a server device (e.g., the server device 302) to execute the set of instructions (e.g., a script) in a debug mode in response to a request from a client device (e.g., the client device 312).

The technique 700 may include determining (at operation 720) whether a user is permitted to access an instruction of the set of instructions that is associated with the breakpoint. For example, the instruction associated with the breakpoint may be stored in a file (e.g., a text file) that is associated with user access permission (e.g., permission to read, write, and/or execute the file). In some implementations, a user associated with a request (e.g., a user account used to make the request) from a client device that caused the set of instructions to be executed is considered. In some implementations, a table of access permissions may be maintained in a datacenter (e.g., the datacenter 108). The table of access permissions may indicate which users have permission to access (e.g., to read) particular files or directories. For example, a table of access permissions may be stored on a server device (e.g., on the server device 302 in the memory 206). For example, a table of access permissions may be stored on a database server (e.g., on the database server 116) and consulted via network communications from a server device (e.g., the server device 302). In some implementations, the table of access permissions is checked using an identifier for the user being considered and an identifier for the file in which the instruction associated with the breakpoint is stored to determine (at operation 720) whether the user is permitted to access the instruction. In some implementations, an access permissions list for a file storing the instruction associated with the breakpoint is stored with the file. For example, information classifying or identifying a user associated with a request that causes the set of instructions to be executed may be checked against an access permissions list for the file to determine (at operation 720) whether the user is permitted to access the instruction associated with the breakpoint.

If (at operation 725) the user has permission to access the instruction associated with the breakpoint, then execution of the set of instructions may be paused (at operation 730) to provide an opportunity for the user to read the file in which the instruction associated with the breakpoint is stored, examine the debugger state (e.g., variables used by the set of instructions), and/or input commands for continued execution in a debug mode. For example, a copy of the file storing the instruction associated with the breakpoint may be sent to a client device (e.g., the client device 312) after the execution is paused (at operation 730) to allow the user to review instructions in the file. In some implementations, execution of the identified set of instructions is paused (at operation 730) by issuing or withholding a command to a script engine through a debug API. For example, the application module 330 may pause (at operation 730) execution of a script by issuing a command to the script module 340 through its debug API provided by the debug controller 344, where the command may cause the script module 340 to enter a pause state. For example, the application module 330 may pause (at operation 730) execution of a script by withholding a command to the script module 340 through its debug API provided by the debug controller 344, where the command would cause the script module 340 to execute the next instruction.

If (at operation 725) the user does not have permission to access the instruction associated with the breakpoint, then, responsive to the determination that the user is not permitted to access the instruction from the set of instructions that is associated with the breakpoint, the breakpoint may be skipped (at operation 740) by executing the instruction associated with the breakpoint without pausing execution of the set of instructions. In some implementations, breakpoints may be associated with specific users, and a breakpoint for a user may be removed from the system once it is determined that the user lacks permission to use the breakpoint. For example, the breakpoint may be removed or disassociated from the file storing the instruction associated with the breakpoint. For example, the breakpoint may be disassociated from the user.

Although the technique 700 is shown as a series of operations for clarity, implementations of the technique 700 or any other technique, process, or algorithm described in connection with the implementations disclosed herein can be performed in various orders or concurrently. Additionally, operations in accordance with this disclosure can be performed with other operations not presented and described herein. For example, the technique 600 of FIG. 6 may be used to terminate execution of the identified set of instructions responsive to determining that a debugger interface on the client device (e.g., the client device 312) is no longer available to control execution of the identified set of instructions. For example, the technique 600 of FIG. 6 may be used to, responsive to a determination that the session associated with the request has terminated, skip one or more remaining breakpoints associated with the identified set of instructions. Furthermore, one or more aspects of the systems and techniques described herein can be omitted.

Figure 8:
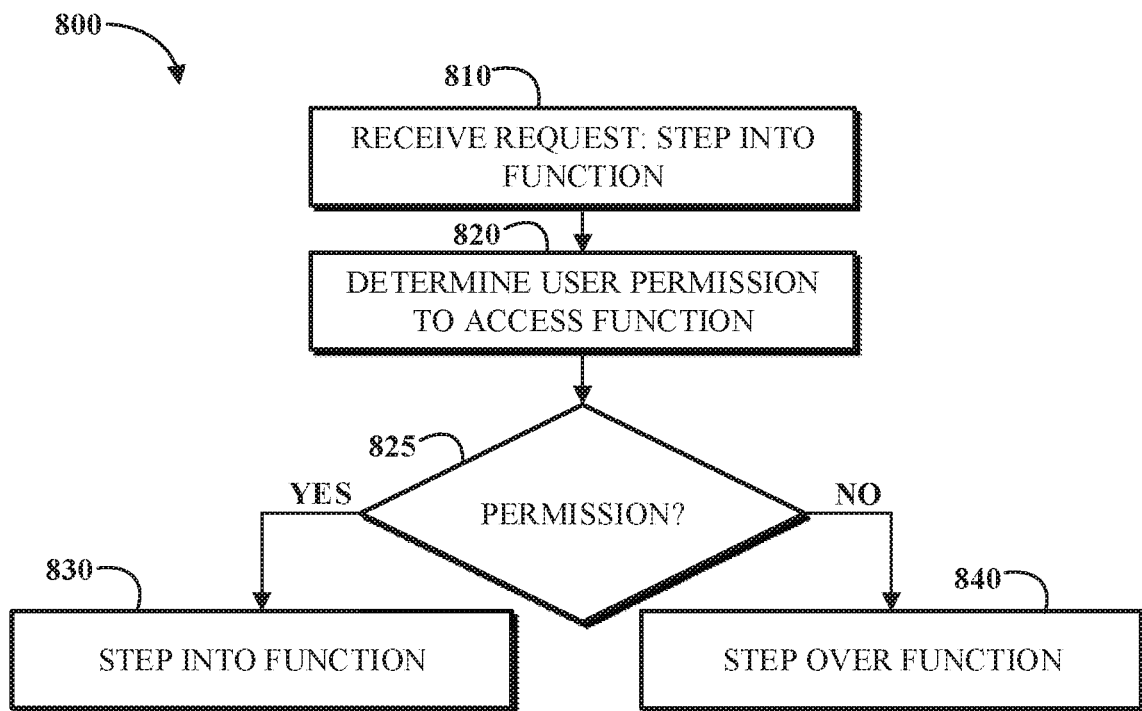
FIG. 8 is a flowchart illustrating an example of a technique for controlling access to instructions in functions while running a debugger.

FIG. 8 is a flowchart illustrating an example of a technique 800 for controlling access to a set of instructions in functions while running a debugger in an electronic computing and communications system, such as the system 100 as generally illustrated in FIG. 1. In some implementations, the technique 800 can be executed using computing devices, such as the systems, modules, and devices described with respect to FIGS. 1, 2, and 3. In some implementations, the technique 800 can be performed, for example, by executing a machine-readable code, such as instructions or programs written to JavaScript, C, or other such computer programming languages. The steps, or operations, of the technique 800 or any other method, process, or algorithm described in connection with the implementations disclosed herein can be implemented directly in hardware, firmware, software executed by hardware, circuitry, or a combination thereof.

Users may not have permission to read all of the source code for the services they are able to access on a server. For example, the source code for certain functions that users utilize via an API may be hidden, for example, to protect against network security threats or to protect trade secrets. For example, the technique 800 may provide security by preventing inadvertent or malicious access to instructions without permission using the stepping controls of a debugger instance on a server.

The technique 800 may include receiving (at operation 810) a request from a client device that includes a step into function debug command; determining (at operation 820) whether a user has permission to access a function associated with the step into command; and, if (at operation 825) the user has permission, stepping into (at operation 830) the function from the set of instructions, or, if (at operation 825) the user does not have permission, continuing (at operation 840) execution of the set of instructions by stepping over the function. In some implementations, by stepping over a function that a user lacks permission to read, the security of portions of the set of instructions (e.g., a script) may be protected.

A request is received (at operation 810) from a client device (e.g., the client device 312). The request may include a step into command that, if performed, would cause a debugger instance to pause execution at an instruction stored in a file different from the file currently being displayed to a user on the client device (e.g., displayed in the coding pane 920 of FIG. 9). For example, the debugger instance may have been instantiated and operated to implement the technique 400 of FIG. 4 to execute a set of instructions in a debug mode on a server device (e.g., the server device 302), which received (at operation 810) the request via a network interface (e.g., the network communication unit 218). For example, a request received (at operation 810) from the client device may be a request to step into a set of instructions (e.g., a function or method) from a larger set of instructions being executed in a debug mode.

The technique 800 may include determining (at operation 820) whether a user is permitted to access a subset of instructions (e.g., a function or method) from a set of instructions being executed in a debug mode. For example, the subset of instructions (e.g., a function) may be stored in a file (e.g., a text file) that is associated with user access permission (e.g., permission to read, write, and/or execute the file). In some implementations, a user associated with the request (e.g., a user account used to make the request) from the client device is considered. In some implementations, a table of access permissions may be maintained in a datacenter (e.g., the datacenter 108). The table of access permissions may indicate which users have permission to access (e.g., to read) particular files or directories. For example, a table of access permissions may be stored on a server device (e.g., on the server device 302 in the memory 206). For example, a table of access permissions may be stored on a database server (e.g., on the database server 116) and consulted via network communications from a server device (e.g., the server device 302). In some implementations, the table of access permissions is checked using an identifier for the user being considered and an identifier for the file in which the subset of instructions (e.g., a function) is stored to determine (at operation 820) whether the user is permitted to access the subset of instructions. In some implementations, an access permissions list for a file storing the subset of instructions (e.g., a function) is stored with the file. For example, information classifying or identifying a user associated with the request may be checked against the access permissions list for the file to determine (at operation 820) whether the user is permitted to access the subset of instructions (e.g., a function).

If (at operation 825) the user has permission to access the subset of instructions (e.g., a function) implicated by the request, then a debugger instance may step into (at operation 730) the subset of instructions (e.g., a function) implicated by the request. For example, execution of the set of instructions may be paused at a first instruction of the subset of instructions to provide an opportunity for the user to read the file in which the subset of instructions is stored, examine the debugger state (e.g., variables used by the set of instructions), and/or input commands for continued execution in a debug mode. For example, a copy of the file storing the subset of instructions (e.g., a function) may be sent to a client device (e.g., the client device 312) after the execution is paused (at operation 830) to allow the user to review instructions in the file. In some implementations, execution of the identified set of instructions is paused (at operation 830) by issuing or withholding a command to a script engine through a debug API. For example, the application module 330 may pause (at operation 830) execution of a script by issuing a command to the script module 340 through its debug API provided by the debug controller 344, where the command may cause the script module 340 to enter a pause state. For example, the application module 330 may pause (at operation 830) execution of a script by withholding a command to the script module 340 through its debug API provided by the debug controller 344, where the command would cause the script module 340 to execute the next instruction.

If (at operation 825) the user does not have permission to access the subset of instructions (e.g., a function) implicated by the request, then, responsive to the determination that the user is not permitted to access the subset of instructions, the subset of instructions may be stepped over (at operation 740) by executing the subset of instructions without pausing execution of the set of instructions. For example, the user associated with the request may be denied read access to the file storing the subset of instructions (e.g., a function) by stepping over (at operation 840) the subset of instructions.

Although the technique 800 is shown as a series of operations for clarity, implementations of the technique 800 or any other technique, process, or algorithm described in connection with the implementations disclosed herein can be performed in various orders or concurrently. Additionally, operations in accordance with this disclosure can be performed with other operations not presented and described herein. For example, the technique 600 of FIG. 6 may be used to terminate execution of the identified set of instructions responsive to determining that a debugger interface on the client device (e.g., the client device 312) is no longer available to control execution of the identified set of instructions. For example, the technique 600 of FIG. 6 may be used to, responsive to a determination that the session associated with the request has terminated, skip one or more remaining breakpoints associated with the identified set of instructions. Furthermore, one or more aspects of the systems and techniques described herein can be omitted.

Figure 9:
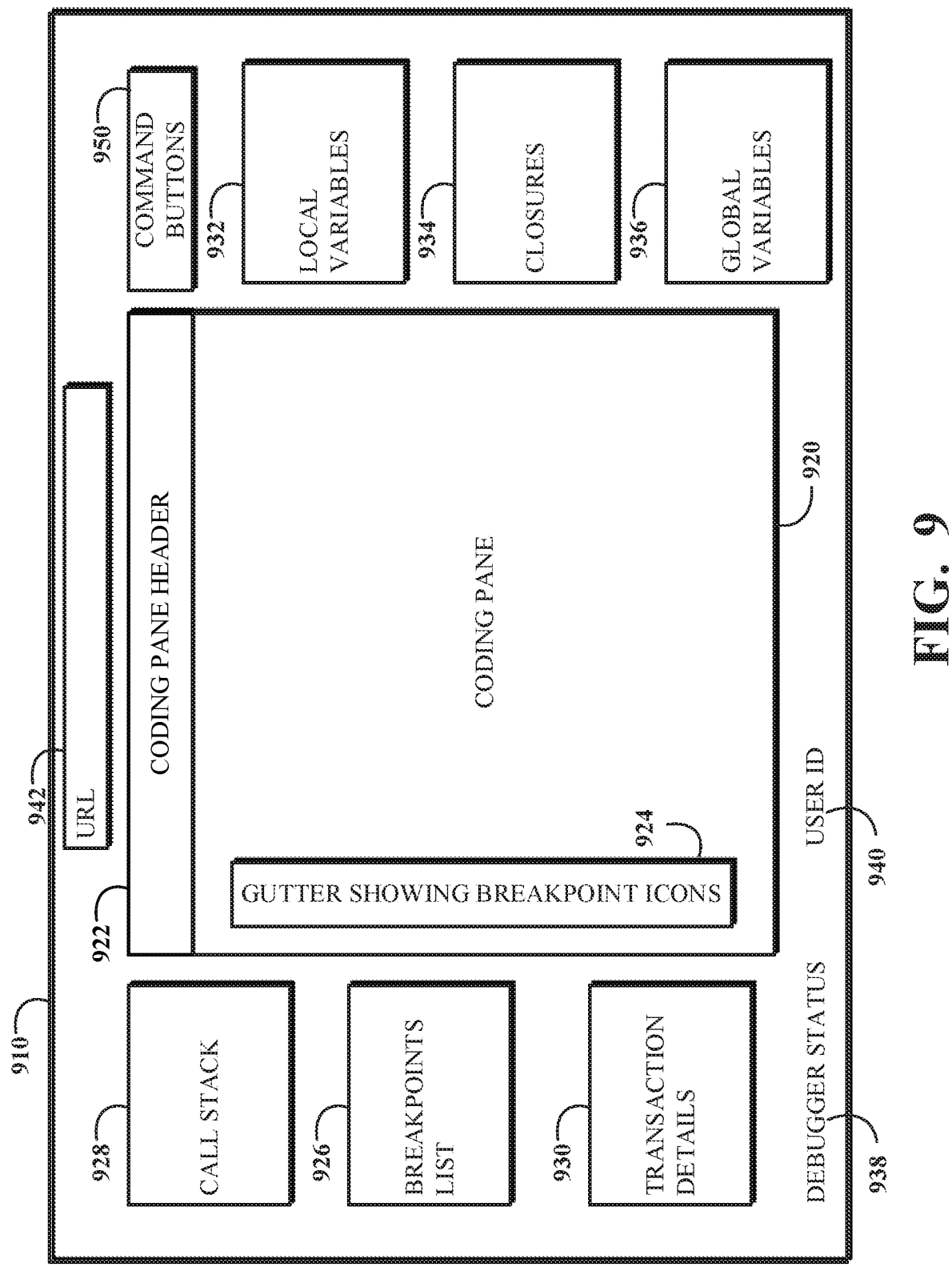
FIG. 9 is a diagram of an example display region generated for presenting a debugger interface.

FIG. 9 is a diagram of an example display region 910 generated for presenting a debugger interface. For example, the display region 910 may be generated by a client device (e.g., the client device 312) for presentation (e.g., in the web browser 322) to a user of the client device based on data transmitted by a server (e.g., the server device 302) that is running a debugger instance controlled based on requests received from the client device. For example, the display region 910 may be displayed in a user interface (e.g., the user interface 220) of the client device. In some implementations, the display region 910 displays information about, for example, breakpoints; the call stack and line number of a currently executing script line; and details about variables and transactions.

The display region 910 may include a coding pane 920 that may display a portion of a set of instructions (e.g., a script) that is being executed in a debug mode on the server. When execution of the set of instructions is paused, the coding pane 920 may also include a pointer or other marking indicating at which instruction in the set of instructions the execution is currently paused. The display region 910 may include a coding pane header 922 that displays a script type and name of a script shown in the coding pane 920. The display region 910 may include a gutter 924 that shows breakpoints that have been set in the script using icons overlaid in the coding pane 920 to the left of lines corresponding to instructions in the script that have been associated with breakpoints.

The display region 910 may include a breakpoints list 926 that displays a list of the breakpoints set by script type, script name, and line number. A debugger instance may update this list as a user adds or removes breakpoints. The display region 910 may include a call stack 928 that displays a list of script calls that preceded or invoked the current instruction or line number. The call stack 928 information may be updated when a debugger instance pauses at a breakpoint. The display region 910 may include a transaction details portion 930 that displays information about the current transaction. The transaction details portion 930 information may be updated when a debugger instance pauses on a breakpoint. For example, the transaction details portion 930 may include the display region 1010 of FIG. 10.

The display region 910 may include a local variables portion 932 that displays a list of local scope (e.g., JavaScript) variable names and their values. The local variables portion 932 information may be updated when a debugger instance pauses on a breakpoint. The display region 910 may include a closures portion 934 that displays a list of global scope (e.g., JavaScript) variable names and their values set by function closure. The closures portion 934 information may be updated when a debugger instance pauses on a breakpoint. The display region 910 may include a global variables portion 936 that displays a list of global scope (e.g., JavaScript) variable names and their values. The global variables portion 936 information may be updated when a debugger instance pauses on a breakpoint.

The display region 910 may include a debugger status 938 that displays an indication when a debugger instance is waiting for a breakpoint, paused on a breakpoint, or has encountered an exception. The display region 910 may include a user identifier 940 that displays a name of the user who is controlling the current debugger instance. The display region 910 may include a URL 942 that displays an address (e.g., a uniform resource locator (URL)) of a currently paused debugger transaction, which may be used to access debug state information for a debugger running on the server.

The display region 910 may include command icons 950 that enable the user to select commands to be issued in requests sent to the server running a debugger instance. The command icons 950 may include a disable debugging icon that stops any current debugging instance and/or disables a debug mode for the current user. The debugger instance does not pause execution of the script on breakpoints for the current user until the debugger instance is restarted. The command icons 950 may include a resume script execution icon that advances from the current breakpoint to the next breakpoint. If there are no other breakpoints, the script runs to completion. The command icons 950 may include a step over next function call icon that advances to the next evaluated line of the script based on current conditions. The debugger instance may skip any instructions that do not need to run because their conditions are not met. The command icons 950 may include a step into next function call icon that advances to the first line of executed code within a function or method call. Stepping into a method may update the current position within the call stack. If the user does not have read access to the function or method call, then this control may act like a step over command instead. The command icons 950 may include a step out of current function icon that exits from the current function or method call and returns to the calling script from the call stack. If the user is not within a function or method call, then this control may act like a step over command instead.

Figure 10:
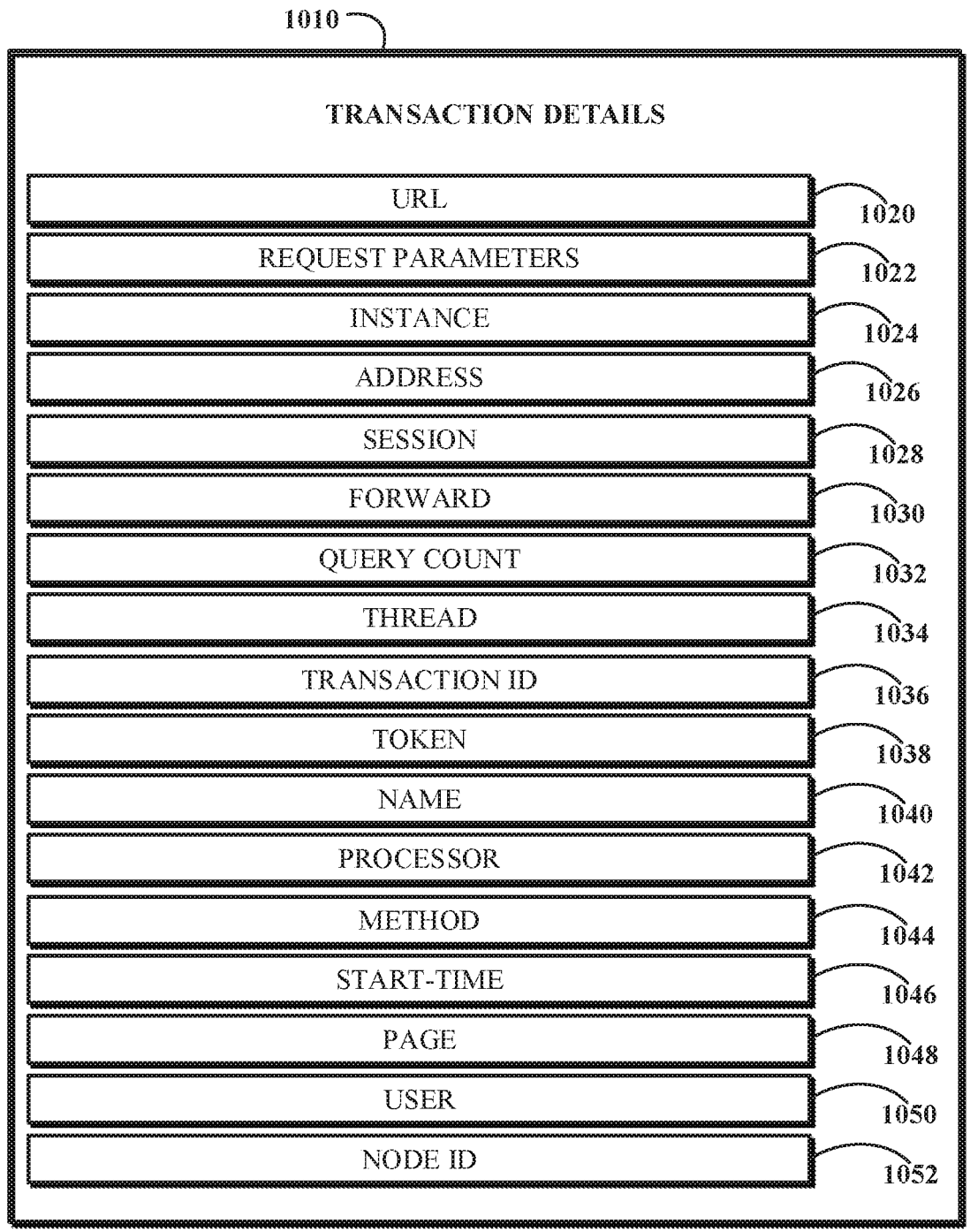
FIG. 10 is a diagram of an example display region generated for presenting debug transaction details to facilitate debugging, from a client device, of a set of instructions running on a server.

FIG. 10 is a diagram of an example display region 1010 generated for presenting debug transaction details for debugging a set of instructions (e.g., a script) running on a server from a client device. The display region 1010 may display transaction details for a current paused user debug transaction. For example, the display region 1010 may be presented in a dedicated re-sizeable section, for example, in the transaction details portion 930 of the display region 910. Information shown in the display region 1010 may be updated when it pauses on a script. Users can use the display region 1010 to: inspect the URL of the currently paused transaction; inspect the request parameters for the currently paused transaction; inspect network information about the current transaction; and/or inspect the user and session ID that initiated the debug transaction.

The display region 1010 may provide a standard set of transaction details for developers to debug and troubleshoot sets of instructions, such as scripts. In some implementations, the display region 1010 may include a URL portion 1020 that displays an address (e.g., a URL) of the currently paused transaction. The display region 1010 may include a request parameters portion 1022 that displays a list of request parameters for this transaction. A transaction may have its own list of request parameters. For example, record transactions may include the field values used to insert, update, or delete a record. The display region 1010 may include an instance portion 1024 that displays a name of a debugger instance running on a server (e.g., the server device 302).

The display region 1010 may include an address portion 1026 that displays an IP address of the end-user client system (e.g., the client device 312). The display region 1010 may include a session portion 1028 that displays a user session ID that identifies a session used to synchronize a debugger instance state between a server (e.g., the server device 302) and a client (e.g., the client device 312). The display region 1010 may include a forward portion 1030 that displays an IP address of a load balancer (e.g., the load balancer 110). The display region 1010 may include a query count portion 1032 that displays a number of database queries the debugger instance has made. The display region 1010 may include a thread portion 1034 that displays a name of a thread running the debugger instance on the server. The display region 1010 may include a transaction ID portion 1036 that displays a system identifier of the current transaction. The display region 1010 may include a token portion 1038 that displays a token of the currently paused transaction. The system may use this token to identify different debugger instances running on a server (e.g., the server device 302). The display region 1010 may include a name portion 1040 that displays a name of the currently paused transaction. This name may be used to identify transactions in logs. The display region 1010 may include a processor portion 1042 that displays a name of the processor processing the current transaction. The display region 1010 may include a method portion 1044 that displays an HTTP request method that the currently paused transaction uses. The display region 1010 may include a start-time portion 1046 that displays a date-time stamp indicating when the debugger instance started. The display region 1010 may include a page portion 1048 that displays a current table or user interface page associated with the transaction. The display region 1010 may include a user portion 1050 that displays a name of a user who triggered the debug transaction. The display region 1010 may include a node ID portion 1052 that displays a system identifier of the node running the debugger instance (e.g., the application node 114).

Figure 11A:
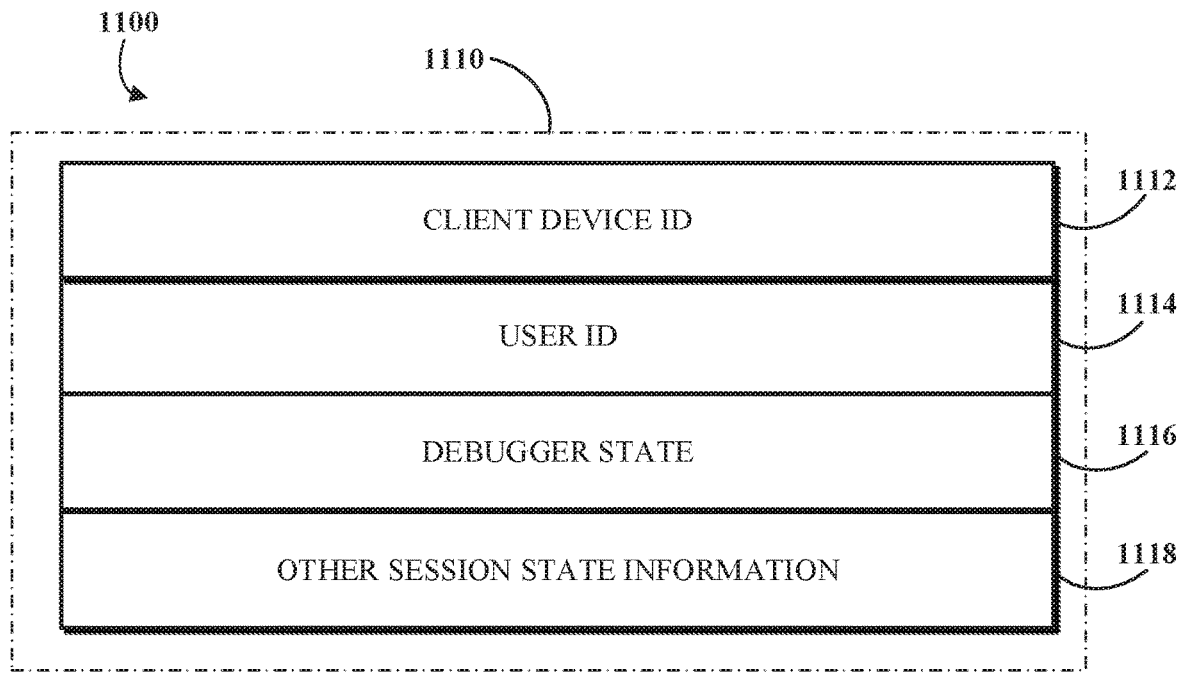
FIG. 11A is a memory map showing an example format for a session data structure that is used to facilitate debugging, from a client device, of a set of instructions running on a server.

FIG. 11A is a memory map 1100 showing an example format for a session data structure 1110 that is used to facilitate debugging, from a client device, of a set of instructions running on a server. The session data structure 1110 may be used to maintain state between requests for ongoing communications with a client device (e.g., the client device 312) operated by a user.

The session data structure 1110 may be associated with a client device, for example, the session data structure 1110 may include a client device identifier 1112 (e.g., a name or an IP address) for a client device conducting the session. The session data structure 1110 may be associated with a user, for example, the session data structure 1110 may include a user identifier 1114 (e.g., a name or a login) for a user conducting the session.

The session data structure 1110 may be associated with a debugger instance, for example, the session data structure 1110 may include a debugger state 1116 for a debugger instance that is being controlled based on requests received as part of the session. For example, the debugger state 1116 may include pointers to a set of instructions being executed, a pointer to the next instruction to be executed, names and values of variables used by a set of instructions being executed, and/or other data used by a debugger instance. The debugger state 1116 may be synchronized with a corresponding debugger state on the client device (e.g., the client device 312) that is used to present debug information to a user in a debugger interface (e.g., the display region 910). In some implementations, the debugger state 1116 is synchronized between a client and a server responsive to the occurrence of a pause event on the server executing a set of instructions (e.g., a script).

The session data structure 1110 may include other session state information 1118, which may help to maintain a session and/or to terminate a session. For example, the other session state information may include a session identifier, which may be used by the client and/or server to reference the session; a start date-time stamp for the session; and/or session timeout data (e.g., a timestamp of the last communication received from the client device and/or a maximum duration between communications for an active session).

In some implementations, the session data structure 1110 is stored in memory (e.g., the memory 206) on an application server (e.g., the server device 302). In some implementations, the session data structure 1110 is stored on a database server (e.g., the database server 116) and is accessed via a network interface (e.g., the network communication unit 218) by an application server (e.g., the server device 302) that is conducting the session with a client (e.g., the client device 312).

Figure 11B:
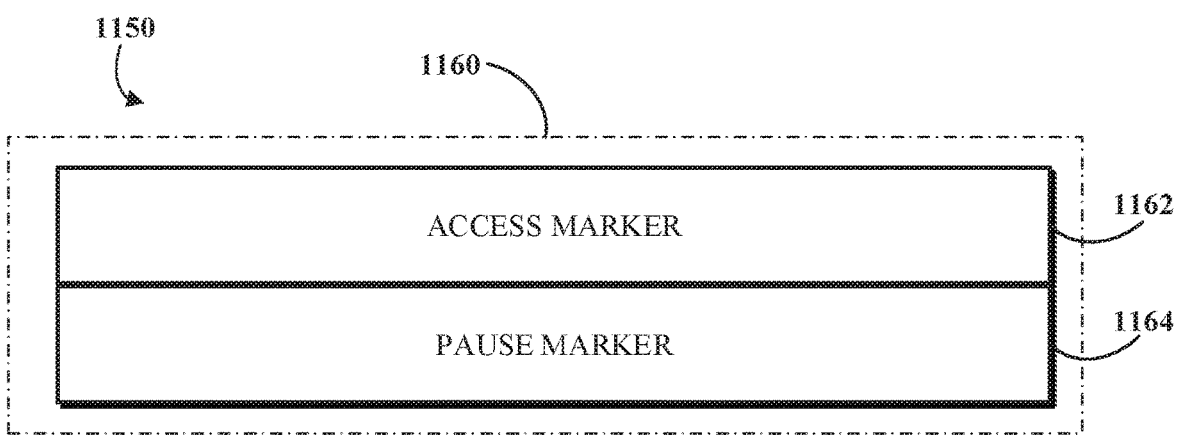
FIG. 11B is a memory map showing an example format for a data structure associated with a session that is used to facilitate debugging, from a client device, of a set of instructions running on a server.

FIG. 11B is a memory map 1150 showing an example format for a data structure 1160 associated with a session that is used to facilitate the debugging, from a client device, of a set of instructions running on a server. The data structure 1160 may be used to facilitate concurrency control for an associated data structure (e.g., the session data structure 1110). For example, the data structure 1160 may occur in or be referenced by a pointer in a table of active sessions that also includes or references with a pointer a corresponding session data structure (e.g., the session data structure 1110) for the data structure 1160. In some implementations, the data structure 1160 is associated with a session data structure by being part of a session data structure (e.g., the session data structure 1110).

The data structure 1160 may include an access marker 1162 that may be used to help control access to a shared data structure (e.g., a session data structure) by multiple threads and/or transactions. For example, the access marker 1162 may include a mutex. For example, the access marker 1162 may include a semaphore (e.g., a binary semaphore). In some implementations, the access marker 1162 may include a transaction identifier for identifying which transaction is currently using an associated session data structure. In some implementations, the access marker 1162 may include a thread identifier for identifying which thread is currently using an associated session data structure.

The data structure 1160 may include a pause marker 1164 that may be used to help limit the number of threads and/or transactions that may be concurrently paused using an associated data structure (e.g., a session data structure). In some implementations, the pause marker 1164 may include a mutex or a binary semaphore and be used to prevent more than one thread or transaction from being concurrently paused using a session data structure (e.g., the session data structure 1110). In some implementations, the pause marker 1164 may include a semaphore, and the number of concurrently paused threads or transactions may be limited to a larger number. In some implementations, the pause marker 1164 may include a transaction identifier for identifying a transaction that is paused using an associated session data structure. In some implementations, the pause marker 1164 may include a thread identifier for identifying a thread that is paused using an associated session data structure.

In some implementations, the data structure 1160 is stored in memory (e.g., the memory 206) on an application server (e.g., the server device 302). In some implementations, the data structure 1160 is stored on a database server (e.g., the database server 116) and is accessed via a network interface (e.g., the network communication unit 218) by an application server (e.g., the server device 302) that is conducting the session with a client (e.g., the client device 312).

Figure 12:
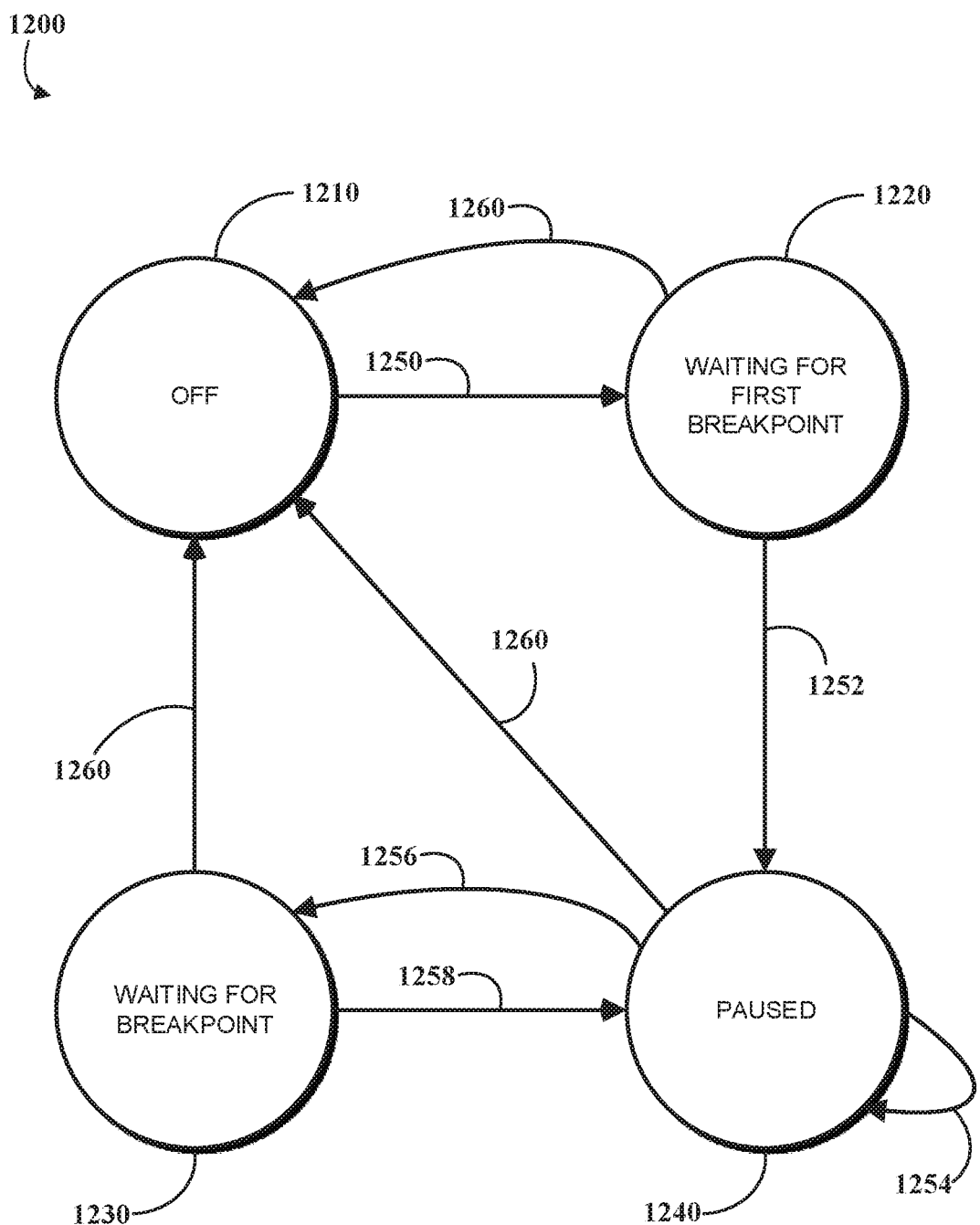
FIG. 12 is a state diagram of an example interface for debugging, from a client device, of a set of instructions running on a server.

FIG. 12 is a state diagram 1200 of an example interface for debugging, from a client device, of a set of instructions running on a server. The state of a debugger instance determines what debugging actions are available and what information can be displayed. In some implementations, an indication of the state of a debugger instance may be presented to a user via a user interface (e.g., the user interface 220), for example, as the debugger status 938 in the display region 910.

In the off state 1210, a debugger instance is inactive and does not pause scripts or display debugging information. In the waiting for first breakpoint state 1220, a debugger instance may initiate execution of a set of instructions (e.g., a script) and be ready to pause the script and display debugging information when it reaches a first breakpoint associated with the script. In the waiting for breakpoint state 1230, a debugger instance is searching for the next instruction or line of code associated with a breakpoint at which to pause. In the paused state 1240, a debugger instance has paused at an instruction or a line of code, and the user can debug the script.

In some implementations, a transition 1250 from the off state 1210 to the waiting for first breakpoint state 1220 occurs when a user starts a script debugger instance by, for example, opening a debugger window or tab in a user interface (e.g., in the web browser 322) or starting a debugger instance with a hot key (e.g., pressing F2 to start a debugger instance).

In some implementations, a transition 1252 from the waiting for first breakpoint state 1220 to the paused state 1240 occurs when execution of the set of instructions (e.g., the script) first reaches an instruction of the set of instructions that is associated with a breakpoint and execution is paused at that breakpoint.

Actions available in the paused state that do not cause a state transition 1254 may include, for example, displaying the call stack; displaying transaction information; or displaying variable values.

In some implementations, a transition 1256 from the paused state 1240 to the waiting for breakpoint state 1230 occurs when the user resumes processing by issuing a resume command, or when the user steps through a script by issuing a step command (e.g., step into, step over, or step out).

In some implementations, a transition 1258 from the waiting for breakpoint state 1230 to the paused state 1240 occurs when execution of the set of instructions (e.g., a script) is paused at the next breakpoint, or when execution of the set of instructions (e.g., a script) is paused at the next instruction (e.g., a script line) requiring evaluation following a step command (e.g., step into, step over, or step out).

In some implementations, a transition 1260 from any other state to the off state 1210 may occur when the user pauses execution of the set of instructions (e.g., a script); the user closes a debugger window or tab in the user interface (e.g., in the web browser 322); the user session ends for any reason; or an administrator for the server (e.g., the server device 302) resets all debugger instances running on the server (e.g., by navigating to a debugger reset.do page).

Figure 13:
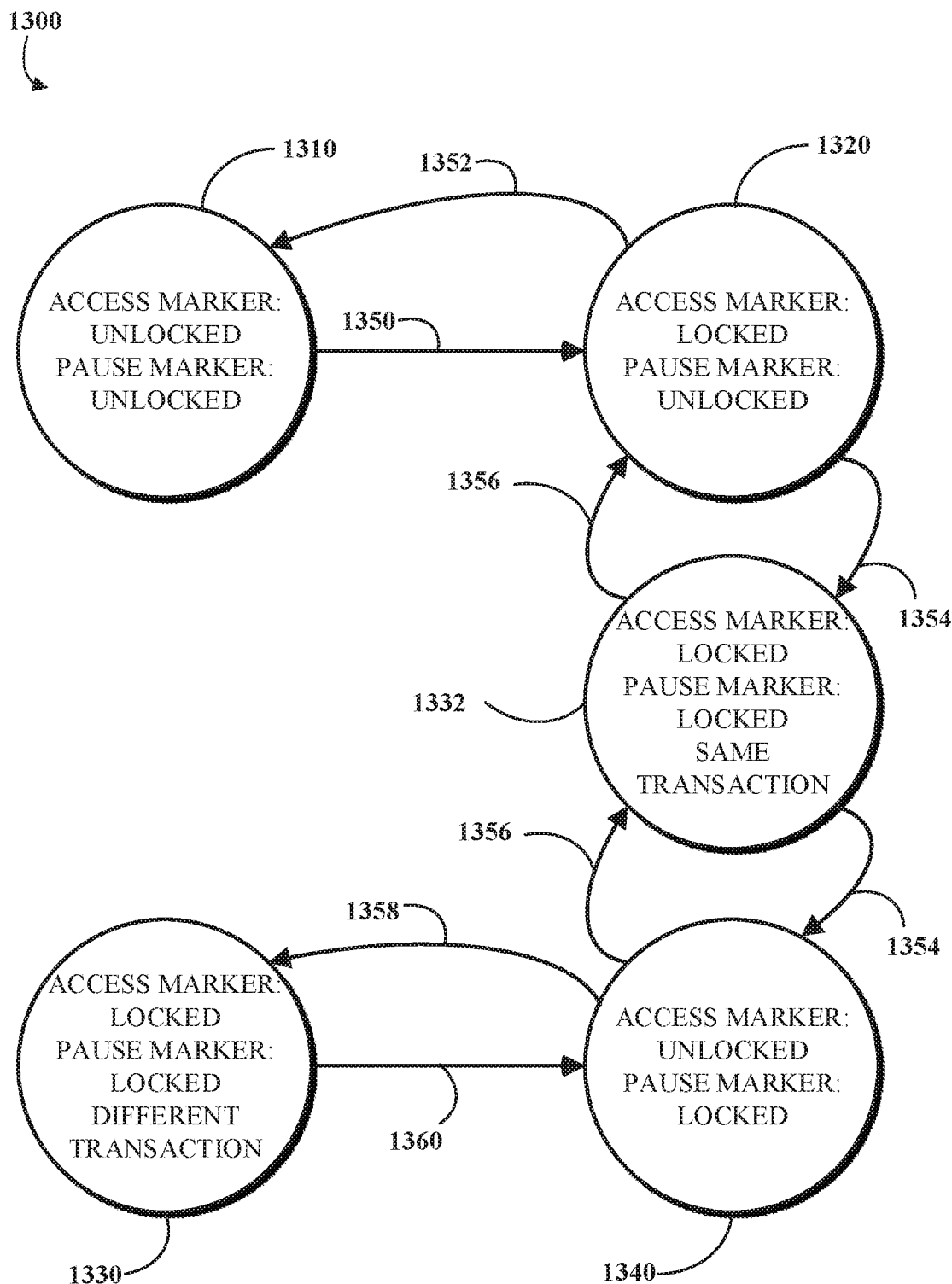
FIG. 13 is a state diagram of an example session access controller for debugging, from a client device, of a set of instructions running on a server.

FIG. 13 is a state diagram 1300 of an example session access controller for debugging, from a client device, of a set of instructions running on a server. In this example, use of a session is controlled using two binary markers, a binary session access marker and a binary pause marker. For example, the markers may be implemented as binary semaphores. The session access marker may be locked when a transaction is currently using the session and unlocked otherwise. The pause marker may be locked when a transaction is currently paused using the session and unlocked otherwise.

In this example, there are five states. In state 1310, the access marker is unlocked and the pause marker is unlocked. The session is not reserved and is available for execution of transactions and to pause debugged transactions. In state 1320, the access marker is locked and the pause marker is unlocked. In this state, the session is being used currently but no transaction is currently paused using the session. In state 1330, the access marker is locked and the pause marker is locked, but by different transactions. For example, the pause marker and the access marker may respectively include a transaction identifier or other information specifying which transaction has locked that marker. The session is being used currently by a transaction (e.g., a debug control transaction) and another, different transaction (e.g., a debugged transaction) is currently paused using the session. In state 1332, the access marker is locked and the pause marker is locked by the same transaction. The session is being used currently by a transaction that has locked the pause marker (e.g., a debugged transaction). For example, state 1332 may be a transient state that is passed through as a system implements logic to update both the access marker and the pause marker at essentially the same time, although not actually simultaneously. In state 1340, the access marker is unlocked and the pause marker is locked. The session is currently available for use but another transaction is currently paused using the session and thus pausing an additional transaction using the session is not currently permitted.

State transition 1350 occurs when a transaction acquires the session by updating the session access marker to the locked state. For, example the transaction acquiring the session may be a debugged transaction (e.g., with a set of instructions associated with one or more breakpoints), a debug control transaction (e.g., a resume or step command), or some other type of transaction that uses the session data structure (e.g., an unrelated request for a webpage from the server). The state transition 1352 occurs when a transaction using the session completes and releases the session data structure by updating the session access marker to the unlocked state.

The state transition 1354 occurs when a debugged transaction reaches a breakpoint and pauses execution of its set of instructions. The state transition 1354 changes the state from state 1320 to state 1340, via a transient stop at state 1332. The debugged transaction updates the pause marker to the locked state to indicate that a transaction is paused using the data structure and then it releases the session by updating the session access marker to the unlocked state. The state transition 1356 occurs when a debugged transaction resumes from a paused state using the session. The state transition 1356 changes the state from state 1340 to state 1320, via a transient stop at state 1332. The debugged transaction acquires the session by updating the session access marker to the locked state to indicate that a transaction is using the data structure and then it updates the pause marker to the unlocked state to indicate that a transaction is no longer paused using the session.

State transition 1358 occurs when a transaction acquires the session by updating the session access marker to the locked state while a different transaction (e.g., a debugged transaction) is paused. For, example the transaction acquiring the session may be a debug control transaction (e.g., a resume or step command) or some other type of transaction that uses the session data structure (e.g., an unrelated request for a webpage from the server). In state 1330, because the pause marker is locked, the currently executing transaction is not permitted to pause execution. In the case that a debugged transaction reaches a breakpoint while the session is in state 1330, it will skip the breakpoint by continuing execution of its set of instructions without pausing at the breakpoint. The state transition 1360 occurs when a transaction using the session completes and releases the session data structure by updating the session access marker to the unlocked state.

The state diagram 1300 illustrates a five state example using a binary pause marker. In some implementations, not shown in FIG. 13, the pause marker may be allowed to take on more than two values and the concurrent pausing of a limited number (greater than one) of debugged transactions using a session may be permitted. For example, debug control transactions may be executed in a non-debug mode where breakpoints are not checked or enforced or it may be assumed that debug control transactions do not include breakpoints associated with their instructions that would cause them to pause. For example, where the pause marker is implemented as a counter that allows up to two paused transactions using a session, states similar to states 1330 and 1340 may be entered when the maximum number of two paused debugged transactions is reached.

Figure 14:
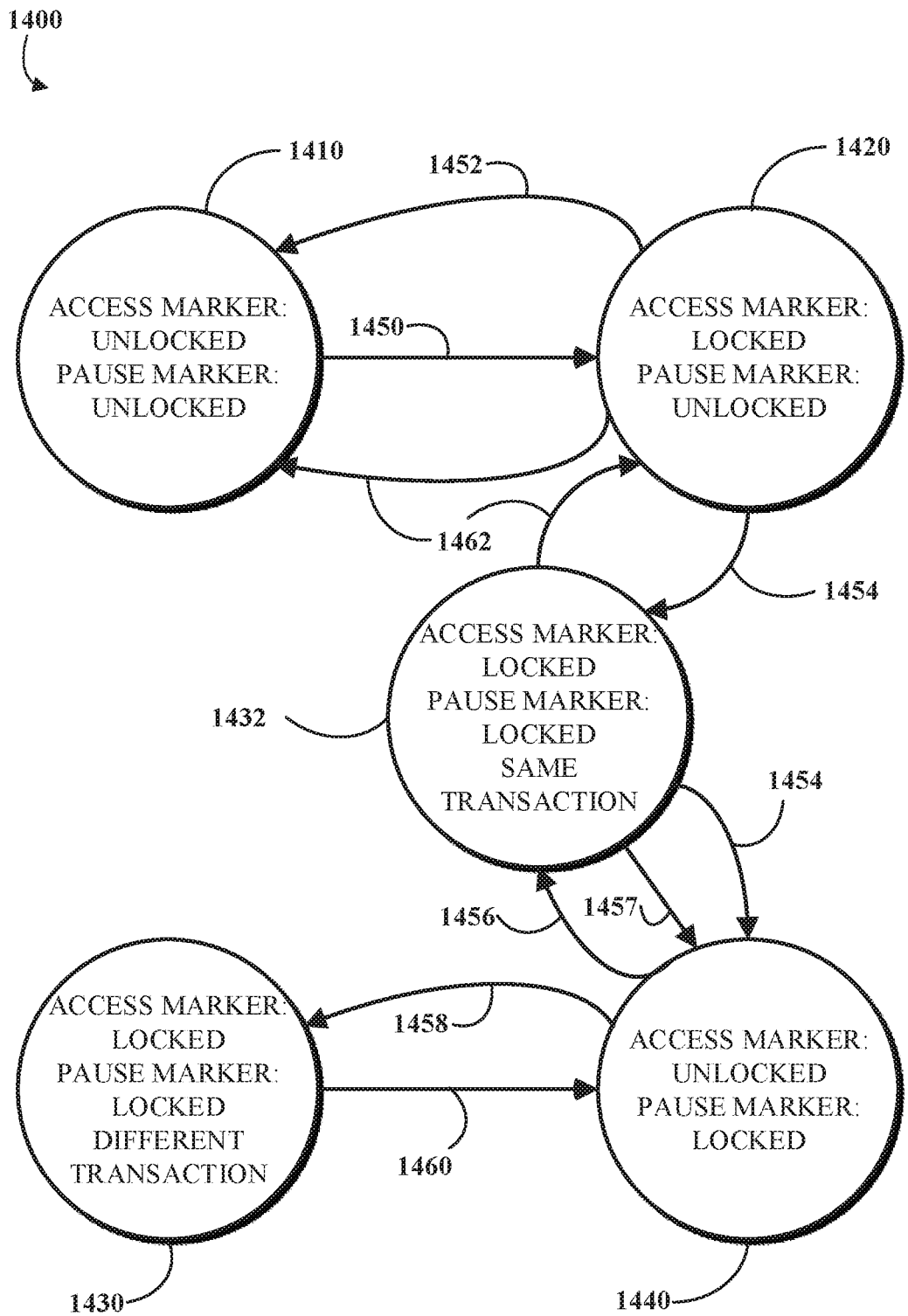
FIG. 14 is a state diagram of an example session access controller for debugging, from a client device, of a set of instructions running on a server.

FIG. 14 is a state diagram 1400 of an example session access controller for debugging, from a client device, of a set of instructions running on a server. In this example, use of a session is controlled using two binary markers, a binary session access marker and a binary pause marker. For example, the markers may be implemented as binary semaphores. The session access marker may be locked when a transaction is currently using the session and unlocked otherwise. The example of FIG. 14 differs from the example of FIG. 13 with regard to the handling of the pause marker. In the example of FIG. 14, instead of unlocking the pause marker when a paused transaction resumes, the pause marker remains locked by a debugged transaction until that debugged transaction is terminated. The pause marker may be locked when a transaction using the session reaches a first breakpoint during its execution and the pause marker may remain locked until that transaction completes execution or is otherwise terminated. This example handling of the pause marker may prevent another debugged transaction from locking the pause marker while the first debugged transaction is executing between subsequent breakpoints and ensure that the first debugged transaction is able to finish debugging in the expected way once its first breakpoint has been reached.

In this example, there are five states. In state 1410, the access marker is unlocked and the pause marker is unlocked. The session is not reserved and is available for execution of transactions and to pause debugged transactions. In state 1420, the access marker is locked and the pause marker is unlocked. In this state, the session is being used currently but no transaction is currently paused using the session. In state 1430, the access marker is locked and the pause marker is locked, but by different transactions. For example, the pause marker and the access marker may respectively include a transaction identifier or other information specifying which transaction has locked that marker. The session is being used currently by a transaction (e.g., a debug control transaction) and another, different transaction (e.g., a debugged transaction) has paused using the session and is holding the pause marker. In state 1432, the access marker is locked and the pause marker is locked by the same transaction. The session is being used currently by a transaction that has locked the pause marker (e.g., a debugged transaction). In state 1440, the access marker is unlocked and the pause marker is locked. The session is currently available for use but a transaction has paused using the session and is holding the pause marker and thus pausing an additional transaction using the session is not currently permitted.

State transition 1450 occurs when a transaction acquires the session by updating the session access marker to the locked state. For, example the transaction acquiring the session may be a debugged transaction (e.g., with a set of instructions associated with one or more breakpoints), a debug control transaction (e.g., a resume or step command), or some other type of transaction that uses the session data structure (e.g., an unrelated request for a webpage from the server). The state transition 1452 occurs when a transaction using the session completes and releases the session data structure by updating the session access marker to the unlocked state.

The state transition 1454 occurs when a debugged transaction reaches a first breakpoint and pauses execution of its set of instructions. The state transition 1454 changes the state from state 1420 to state 1440, via a transient stop at state 1432. The debugged transaction updates the pause marker to the locked state to indicate that a transaction has paused using the data structure and then it releases the session by updating the session access marker to the unlocked state. In this example, the first breakpoint is special because it causes the pause marker to be locked by the debugged transaction, which then continues to hold the pause marker lock until it is terminated.

The state transition 1456 occurs when a debugged transaction resumes from a paused state using the session. The debugged transaction acquires the session by updating the session access marker to the locked state to indicate that a transaction is using the data structure and continues execution of its set of instructions that are being debugged. The state transition 1457 occurs when the debugged transaction holding the lock on the pause marker pauses again, for example, at a subsequent breakpoint after the first breakpoint or after a step command. The debugged transaction, which is holding the lock on the pause marker, unlocks the access marker to allow other transaction (e.g., debug control transactions) to run using the session while it is paused.

State transition 1458 occurs when a transaction acquires the session by updating the session access marker to the locked state while a different transaction (e.g., a debugged transaction) is paused. For, example the transaction acquiring the session may be a debug control transaction (e.g., a resume or step command) or some other type of transaction that uses the session data structure (e.g., an unrelated request for a webpage from the server). In state 1430, because the pause marker is locked, the currently executing transaction is not permitted to pause execution. In the case that a debugged transaction reaches a breakpoint while the session is in state 1430, it will skip the breakpoint by continuing execution of its set of instructions without pausing at the breakpoint. The state transition 1460 occurs when a transaction using the session completes and releases the session data structure by updating the session access marker to the unlocked state.

The state transition 1462 occurs when a debugged transaction that holds the lock on the pause marker is terminated (e.g., upon completing execution of its set of instructions). The state transition 1462 changes the state from state 1432 to state 1410, via a transient stop at state 1420. The debugged transaction updates the pause marker to the unlocked state and then it releases the session by updating the session access marker to the unlocked state.

The state diagram 1400 illustrates a five state example using a binary pause marker. In some implementations, not shown in FIG. 14, the pause marker may be allowed to take on more than two values and the concurrent pausing of a limited number (greater than one) of debugged transactions using a session may be permitted. For example, debug control transactions may be executed in a non-debug mode where breakpoints are not checked or enforced or it may be assumed that debug control transactions do not include breakpoints associated with their instructions that would cause them to pause. For example, where the pause marker is implemented as a counter that allows up to two paused transactions using a session, states similar to states 1430 and 1440 may be entered when the maximum number of two paused debugged transactions is reached.

In some implementations, a user may disable a debugger instance (e.g., by selecting the disable debugging icon in the command icons 950) in order to continue executing a paused set of instructions (e.g., a script) in a non-debug mode (e.g., a production mode) where it skips remaining breakpoints and consumes less computing resources on a server (e.g., the server device 302).

In some implementations, a user can launch a server-side debugger instance from an application navigator, Studio, or from a syntax editor. In some implementations, a debugger transaction remains open as long as an associated user session is valid. If a user session logs out or times out, the system may terminate the debugger transaction.

In some implementations, an administrator for a server (e.g., the server device 302) may grant permission to launch debugger instances on the server to individual users. In some implementations, an administrator for a server (e.g., the server device 302) may configure a limit (e.g., a quarter of the number of semaphores in the application node or the number of semaphores in the node minus two) on the number of concurrent debugger instances that can run on an application node (e.g., the application module 330). In some implementations, an administrator for a server (e.g., the server device 302) may reset, turn off, or disable script debugging for the entire server.

In some implementations, breakpoints for scripts on a server (e.g., the server device 302) are stored or referenced in a breakpoint table. For example, a breakpoint table may be associated with an individual user, and many users can have their own table of breakpoints. For example, different users may be able to debug the same script with different breakpoints. In some implementations, breakpoints may be set or removed in a regular code editor or in a debugger interface (e.g., in the coding pane 920 of the display region 910).

Some implementations of a debugger interface may use a representational state transfer (REST) API.

All or a portion of the implementations of the systems and techniques described herein can be implemented using a general-purpose computer/processor with a computer program that, when executed, carries out any of the respective techniques, algorithms, or machine-readable code described herein. In addition, or alternatively, for example, a special-purpose computer/processor can be utilized, which can include specialized hardware for carrying out any of the techniques, algorithms, or machine-readable code described herein.

The implementations of computing devices as described herein (and the algorithms, techniques, machine-readable code, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, the use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

What is claimed is:

1. A system comprising:
a processor configured to execute code in response to respective requests from a plurality of client devices; and
a memory comprising machine-readable code executable by the processor to cause the processor to perform operations comprising:
receiving a first request from a first client device of the plurality of client devices to pause execution of the code at each of a first plurality of breakpoints;
receiving a second request from a second client device of the plurality of client devices to pause execution of the code at each of a second plurality of breakpoints, wherein each of the second plurality of breakpoints is different from each of the first plurality of breakpoints; and
executing the code according to the first request in a first data structure and according to the second request in a second data structure.

2. The system of claim 1, wherein the operations comprise:
determining that a number of concurrently paused transactions is less than a threshold number of concurrently paused transactions; and
in response to determining that the number of concurrently paused transactions is less than the threshold number of concurrently paused transactions, pausing execution of the code in the first data structure at a first breakpoint of the first plurality of breakpoints.

3. The system of claim 1, wherein the memory stores a breakpoint table configured to identify respective breakpoints corresponding to each request from the plurality of client devices including identifying the first plurality of breakpoints as corresponding to the first request and the second plurality of breakpoints as corresponding to the second request.

4. The system of claim 1, wherein the operations comprise:
receiving a plurality of requests including the first request and the second request from the plurality of client devices, wherein each of the plurality of requests is configurable to correspond to separate definitions of breakpoints.

5. The system of claim 1, wherein the operations comprise:
determining that the first data structure is available to execute the first request; and
in response to determining that the first data structure is available, executing the code according to the first request in the first data structure;
determining a portion of the code corresponding to a respective breakpoint of the first plurality of breakpoints at least in part by referencing a table of breakpoints associated with the first client device; and
pausing execution of the code at or before the portion of the code.

6. The system of claim 5, wherein the operations comprise:
determining that the first data structure is available to execute the first request comprises identifying that an access marker corresponding to the first data structure comprises a first state.

7. The system of claim 1, wherein the operations comprise:
receiving a request from a third client device to access the first data structure as part of an operation unrelated to debugging of the code; and
changing an access marker of the first data structure to indicate that the first data structure is unavailable for debugging.

8. The system of claim 1, wherein the operations comprise:
pausing the execution of the code in the first data structure; and
updating a pause marker to indicate that the execution of the code is paused, wherein the pause marker comprises binary data indicative of a maximum number of concurrent paused sessions.

9. The system of claim 1
pausing the execution of the code in the first data structure; and
updating a pause marker to indicate that the execution of the code is paused, wherein the pause marker corresponds to a counter, wherein a state of the counter indicates a number of concurrent sessions.

10. A method for operating a server device communicatively coupled to a plurality of client devices each operating to debug a code, comprising:
receiving a first request to execute a first portion of the code from a first client device of the plurality of client devices;
determining that a data structure is available to be allocated to an execution of the first portion of the code according to the first request;
accessing a first plurality of breakpoints defined by a user of the first client device as associated with the first request, wherein the first plurality of breakpoints is stored with a plurality of additional breakpoints respectively corresponding to each of the plurality of client devices; and
executing the first portion of the code in the data structure according to the first request, wherein executing the first portion of the code according to the first request includes pausing at respective breakpoints of the first plurality of breakpoints.

11. The method of claim 10, comprising:
receiving a second request to execute a second portion of the code from a second client device of the plurality of client devices;
determining that the data structure is available to be allocated to an execution of the second portion of the code according to the second request; and
executing the second portion of the code in the data structure according to the second request, wherein executing the second portion of the code includes pausing at respective breakpoints of a second plurality of breakpoints different from the first plurality of breakpoints.

12. The method of claim 11, comprising:
providing a first session data to the first client device for presentation via a graphical user interface while executing at least a portion of the second portion of the code in the data structure.

13. The method of claim 10, wherein the data structure is stored in a memory of the server device as a memory map used to maintain information associated with the first client device and the execution of the first portion of the code while the first client device is allocated to the data structure.

14. The method of claim 13, wherein the information maintained by the data structure comprises a value of a variable associated with an executed instruction of the first portion of the code, a name of the variable associated with the executed instruction of the first portion of the code, a debugger state synchronized with a corresponding state of the execution of the first portion of the code, or any combination thereof.

15. The method of claim 10, wherein the first request is generated in response to the first client device receiving an indication of a selection made via a first graphical user interface.

16. An article of manufacture including a tangible, non-transitory, computer-readable medium, having stored thereon program instructions that, upon execution by a computing system, cause the computing system to perform operations comprising:

receiving a first request from a first client device of a plurality of client devices to pause execution of a code at each of a first plurality of breakpoints;

receiving a second request from a second client device of the plurality of client devices to pause execution of the code at each of a second plurality of breakpoints, wherein each of the second plurality of breakpoints is different from each of the first plurality of breakpoints;

executing the code according to the first request; and executing the code according to the second request concurrent to the execution of the code according to the first request.

17. The article of manufacture of claim 16, wherein the operations for executing the code according to the first request comprise:

determining that a data structure is available to be allocated to the execution of the code according to the first request based at least in part of a state of a marker; and executing the code in the data structure according to the first request.

18. The article of manufacture of claim 17, wherein the operations comprise:

accessing an indication of the first plurality of breakpoints from a memory, wherein the first plurality of breakpoints is stored with a plurality of additional breakpoints respectively corresponding to a plurality of additional debug requests, wherein executing the code according to the first request includes pausing at respective breakpoints of the first plurality of breakpoints.

19. The article of manufacture of claim 16, wherein the first client device is configured to access information associated with the execution of the code according to the first request while the execution of the code according to the second request occurs.

20. The article of manufacture of claim 19, wherein the information comprises a value of a variable associated with an executed instruction of the code according to the first request, a name of the variable associated with the executed instruction of the code according to the first request, a debugger state synchronized with a corresponding state of a data structure allocated to the execution of the code according to the first request, or any combination thereof.

* * * * *